(12) United States Patent
Zhang et al.

(10) Patent No.: US 12,054,345 B2
(45) Date of Patent: Aug. 6, 2024

(54) MOVABLE DENSE STORAGE AND PICKING DEVICE, MODULAR WAREHOUSE SYSTEM AND METHOD FOR ASSEMBLING THE SAME

(71) Applicant: SHENZHEN WHALEHOUSE TECHNOLOGY COMPANY LIMITED, Shenzhen (CN)

(72) Inventors: Jun Zhang, Guangdong (CN); Linzi Li, Guangdong (CN); Xiugang Li, Guangdong (CN); Mengwen Zhang, Guangdong (CN)

( * ) Notice: Subject to any disclaimer, the term of this patent is extended or adjusted under 35 U.S.C. 154(b) by 738 days.

(21) Appl. No.: 17/185,860

(22) Filed: Feb. 25, 2021

(65) Prior Publication Data

US 2021/0179364 A1 Jun. 17, 2021

Related U.S. Application Data

(63) Continuation of application No. PCT/CN2019/106526, filed on Sep. 18, 2019.

(30) Foreign Application Priority Data

Sep. 18, 2018 (CN) .......................... 201811090472.5

(51) Int. Cl.
  *B65G 47/52* (2006.01)
  *B65G 1/06* (2006.01)
  (Continued)

(52) U.S. Cl.
  CPC ............... *B65G 47/52* (2013.01); *B65G 1/06* (2013.01); *B65G 47/91* (2013.01); *B65G 61/00* (2013.01);
  (Continued)

(58) Field of Classification Search
  CPC .......... B65G 47/52; B65G 47/91; B65G 1/00; B65G 1/06; B65G 63/004; B65G 2201/0258
  See application file for complete search history.

(56) References Cited

U.S. PATENT DOCUMENTS 3,833,280 A 9/1974 Bell
8,500,377 B2 * 8/2013 Hsiao ................. H05K 7/20736
  410/33

(Continued)

FOREIGN PATENT DOCUMENTS

CN 204280472 U 4/2015
CN 207417685 U 5/2018
(Continued)

OTHER PUBLICATIONS

The Extended European search report of EP application No. 19861551.0 issued on Oct. 1, 2021.

*Primary Examiner* — Saul Rodriguez
*Assistant Examiner* — Ashley K Romano
(74) *Attorney, Agent, or Firm* — Andrew C. Cheng

(57) ABSTRACT

A modular warehouse system and its assembly method are provided. A plurality of storage containers is combined to form a combined storage area, which is provided with a track assembly, a bin gripping robot, and a plurality of bins. An internal space of at least one track-switching container is in communication with the internal space of at least one of the plurality of storage containers. The track-switching container is provided with a track-switching device therein, and the track-track-switching device is configured to switch the bin gripping robot in at least one of the storage containers from a current running track where the bin gripping robot is located to a target running track. An internal space of at least one outbound-inbound container is in communication with the internal space of the track-switching container. The (Continued)

outbound-inbound container is provided with an outbound-inbound device for performing goods outbound-inbound operations.

18 Claims, 23 Drawing Sheets

(51) Int. Cl.
  *B65G 47/91* (2006.01)
  *B65G 61/00* (2006.01)
  *B65G 63/00* (2006.01)

(52) U.S. Cl.
  CPC .... *B65G 63/004* (2013.01); *B65G 2201/0258* (2013.01)

(56) References Cited

U.S. PATENT DOCUMENTS

2009/0293756 A1* 12/2009 Hathaway ............ B61D 47/005
  104/29

2013/0299280 A1* 11/2013 Friedrich ........... B64D 11/0007
  187/245
2021/0380339 A1* 12/2021 Austrheim ............. B65G 1/137

FOREIGN PATENT DOCUMENTS

| | | | |
|---|---|---|---|
| CN | 207551082 U | 6/2018 | |
| CN | 108527322 A | 9/2018 | |
| CN | 109019005 A | 12/2018 | |
| CN | 109051490 A | 12/2018 | |
| CN | 208882650 U | 5/2019 | |
| CN | 208882651 U | 5/2019 | |
| CN | 208882924 U | 5/2019 | |
| EP | 3115319 * | 7/2015 | ............... B65G 1/04 |
| EP | 3115319 A1 | 1/2017 | |
| EP | 3863947 A1 | 8/2021 | |
| JP | H0958863 A | 3/1997 | |
| TW | I580624 B | 5/2017 | |
| WO | 2019/242864 A1 | 12/2019 | |
| WO | WO-2020074242 A1 * | 4/2020 | ........... B65D 88/005 |

* cited by examiner

MOVABLE DENSE STORAGE AND PICKING DEVICE, MODULAR WAREHOUSE SYSTEM AND METHOD FOR ASSEMBLING THE SAME

FIELD

The present invention relates to logistics warehouse technologies and, in particular, to a movable dense storage and picking device, a modular warehouse system and a method for assembling the modular warehouse system, as well as a bin gripping mechanism.

BACKGROUND

Existing logistics warehouses or storehouses need to use a large amount of racks. Many of the existing racks are mobile racks equipped with rollers. The mobile racks are arranged on tracks, and are driven by a driving device to move forward and backward on the tracks to transport goods. In order to improve efficiency, the racks are usually arranged in multiple tiers, and goods are placed on each tier. Due to the goods carried on the racks, moving the racks consumes a lot of electric energy. In addition, for sorting, loading, unloading and other actions of one certain rack, the entire rack system needs to be activated and moved as a whole, which consumes a lot of energy and especially leads to high ineffective power consumption and low power utilization rate. Each mobile rack often weighs hundreds of kilograms. Therefore, when the mobile racks move as a whole, the loss caused by collision with each other is relatively large, and it has high level requirements for the tracks and a braking system. In the existing rack circulation movement system, steering design of common racks is a track loop design, that is, turning radius of the track is very large, and the rack performs a steering cycle on the turning track. In one of various current designs for the switching of the rack tracks, a lateral moving device is adopted, that is, lateral moving tracks are designed at both ends of the track, and a rack transfer device is designated to the lateral moving track, and the rack can be transferred to another track by using the transfer device. The rack has a large weight as a multi-tier structure, which leads to lots of power consumption when being transferred to the transfer device. This structure has high requirements on the load-bearing strength, impact resistance strength and power of the transfer device. For example, Chinese patent application No. 201610955227.0, titled automatic dense warehouse device, and published on Feb. 8, 2017, discloses a warehouse system in which racks are placed on tracks. This kind of rack warehouse system is suitable for a situation where stacks of goods are not high. However, for a situation of higher layer, because the stacking is too high, it may be unsafe during the movement, and the energy loss for ineffective handling is too large.

Moreover, the rack system discussed above cannot be applied to a movable vending system, such as a small vending truck that is temporarily used in an exhibition. The existing small vending trucks are generally operated manually, and automatic storage systems are rarely used.

In addition, on-site installation of the existing automatic warehouse is complicated and has high technical requirements. Also, once installed, it is not easy to expand or reduce capacity, and it is thus difficult to meet a rapidly changing market demand.

SUMMARY

The problem to be solved by the present invention is to provide a movable dense storage and picking device, a modular warehouse system and its assembly method, which adopt completely new automatic warehouse system, such that the movable dense storage and picking device can also employ the automatic warehouse system.

Another problem to be solved by the present invention is to provide a modular warehouse system which is capable of convenient on-site installation and flexible storage capacity adjustment with low cost, which can save time for infrastructure construction, and can realize rapid and mobile deployment of automated warehouses In one aspect, a movable dense storage and picking device is provided, which includes a skid-mounted outer cabin having a storage area and defining an outbound end; a plurality of bins located in the storage area for containing goods; an outbound platform located at the outbound end of the skid-mounted outer cabin; a track assembly installed within the skid-mounted outer cabin and located above the bins; and a bin gripping robot slidably installed on the track assembly and located above the bins, for transporting the bin containing ordered goods from the storage area to the outbound platform.

In another aspect, a modular warehouse system is provided, which includes a plurality of storage containers combined to form a combined storage area, which is provided with a track assembly, a bin gripping robot located on the track assembly, and a plurality of bins located below the bin gripping robot for storing goods, wherein the bin gripping robot is capable of running back and forth on the track assembly to access the bins; at least one track-switching container, an internal space of which is in communication with the internal space of at least one of the plurality of storage containers, wherein the track-switching container is provided with a track-switching device therein, and the track-track-switching device is configured to switch the bin gripping robot in at least one of the storage containers from a current running track where the bin gripping robot is located to a target running track; and at least one outbound-inbound container, an internal space of which is in communication with the internal space of the track-switching container, wherein the track-switching container is provided with an outbound-inbound device for performing goods outbound-inbound operations.

In another aspect, an assembly method of a modular warehouse system is provided, which includes: combining a plurality of storage containers to form a combined storage area, with each storage container defining a length direction and a width direction, wherein the combined storage containers comprise one or more layers of storage containers, such that each layer comprises a plurality of storage containers arranged in parallel and combined in the width direction, and wherein the combined storage area is provided with a track for running the bin gripping robot, wherein the track has been installed in the plurality of storage containers before the plurality of storage containers are combined; installing the track-switching container to at least one end of the plurality of storage containers in each layer of storage containers in the length direction, such that the space of the track-switching container is communicated with the space of the storage containers in the same layer, and the transition track of the track-switching container is perpendicular to the track of the storage container in the same layer, wherein the transition track is configured for running the track-switching robot thereon back and forth, and wherein the transition track of the track-switching container has been fixed to the track-switching container before the track-switching container is installed to the end of the plurality of storage containers.

In another aspect, a bin gripping mechanism for gripping a bin is provided, which includes a liftable gripper platform and a gripper mounted on the gripper platform for gripping a frame of the bin. The bin gripping mechanism further includes an alignment mechanism, which comprises a plurality of alignment members arranged at corners of the gripper platform, wherein each alignment member comprises a vertical extension extending vertically downward and an alignment slope extending downward and outward from a bottom end of the vertical extension, wherein when the gripping mechanism grips the bin, all of the vertical extensions abut against outer surface of the frame and all of the alignment slopes are located below the bottom of the gripping bin, and wherein the alignment slope is configured to be in sliding contact with an upper edge of the frame of a low second low bin if the gripped bin is offset with the second bin in the vertical direction.

In still another aspect, a modular warehouse system is provided, which includes a plurality of storage containers combined to form a combined storage area, which is provided with a track assembly, a bin gripping robot located on the track assembly, and a plurality of bins located below the bin gripping robot for storing goods, wherein the bin gripping robot is capable of running back and forth on the track assembly to access the bins, and the track assembly is fixed on a plate of the storage container; and at least one outbound-inbound container, which is equipped with an outbound-inbound device for performing goods outbound-inbound operations, wherein an internal space of the outbound-inbound container is communicated with an internal space of the combined storage area, such that the bin gripping robot can transport goods between the combined storage area and the outbound-inbound device.

Advantages of the various solutions disclosed in the present application are as follows.

The present invention provides a movable dense storage and picking device, which includes: a skid-mounted outer cabin, a plurality of bins, an outbound platform, a track assembly, and a bin gripping robot and a picking robot. The skid-mounted outer cabin has a storage area and defines an outbound end therein. The plurality of bins is located in the storage area for accommodating goods. The outbound platform is located at an outbound end of the skid-mounted outer cabin. The track assembly is installed within the skid-mounted outer cabin and located above the bins. The bin gripping robot is slidably installed on the track assembly and located above the bins, for transporting the bin containing ordered goods from the storage area to the outbound platform. The picking robot is located within the skid-mounted outer cabin and is arranged adjacent to the outbound platform, for picking ordered goods from the bins located on the outbound platform. The movable dense storage and picking device may be realized as an automatic vending truck or an exhibition truck, which adopts a skid-mounted outer cabin such that most of the components are installed within the skid-mounted outer cabin, thereby realizing the movable function of the entire storage system. In addition, it is possible to achieve a precise alignment in a vertical direction by providing an alignment mechanism for a gripping mechanism of the bin gripping robot, and there is no need to provide a high-cost position detection mechanism on the bin gripping robot, thereby effectively reducing costs. Moreover, the slidable design of the picking robot can improve the picking operation without lengthening the manipulator.

In another aspect, the present invention provides a modular warehouse system which includes one or more of a storage container, a track-switching container and an outbound-inbound container. The modular warehouse system is capable of convenient on-site installation and flexible storage capacity adjustment with low cost, which can save time for infrastructure construction, and can realize rapid and mobile deployment of automated warehouses.

In still another aspect, the present invention provides an assembly method of the above described modular warehouse system. By providing standardized and modular storage containers and track-switching containers, the standardized storage containers and track-switching containers may be stacked and combined according to a set manner, and the container bodies of the standardized storage containers and track-switching containers are respectively formed with detachable side plates, such that, during stacking and combining the storage container and track-switching container, the containers may be connected to form an integrated modular warehouse system with internal spaces of the containers in communication with each other after detaching their adjacent side plates, thus realizing rapid and mobile deployment of automated warehouses.

DESCRIPTION OF THE EMBODIMENTS

Figure 1:
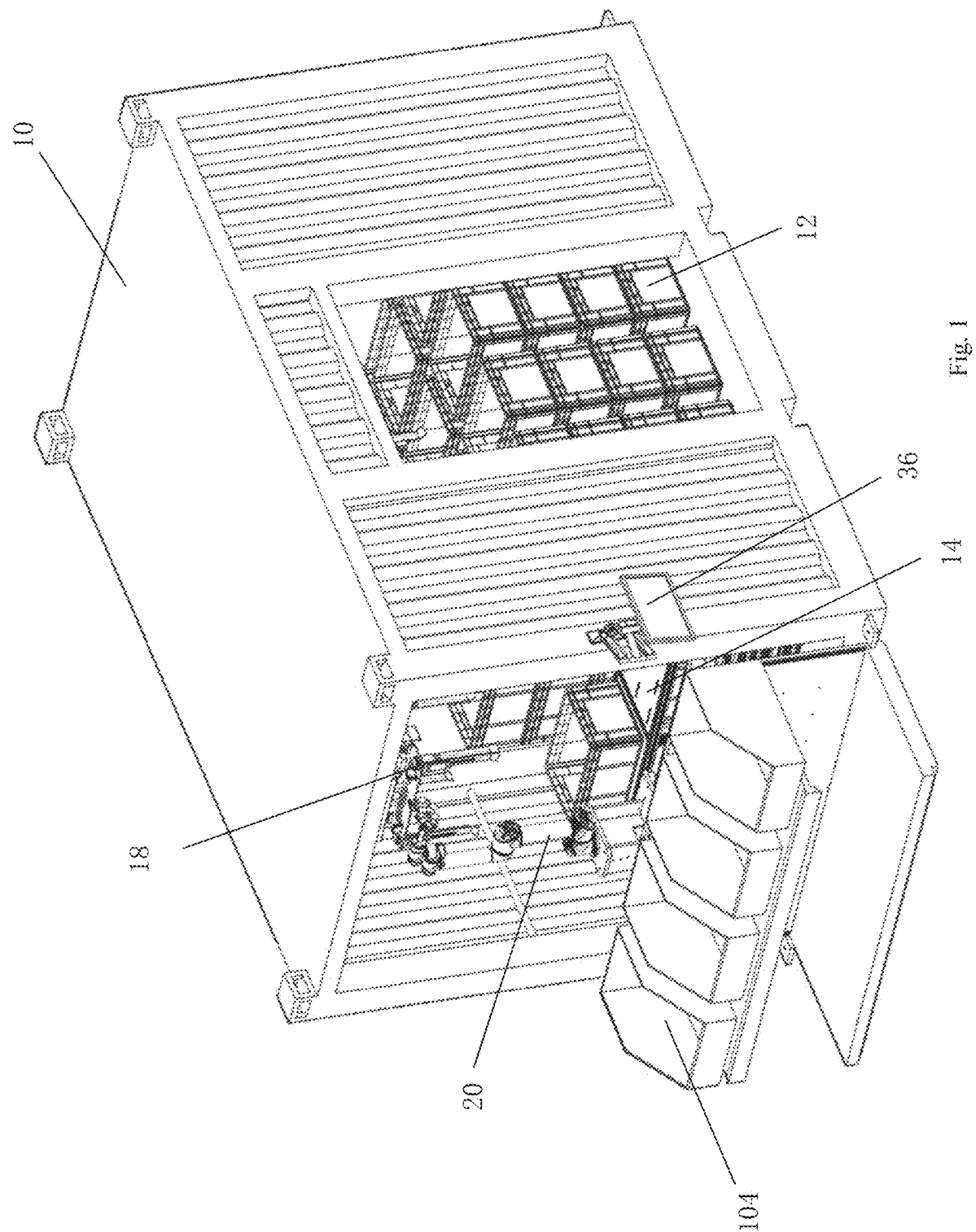
FIG. 1 is a perspective schematic view of an embodiment of a movable dense storage and picking device.

Before describing embodiments in detail, it should be understood that the present invention is not limited to the detailed structure or arrangement of elements described below or illustrated in the drawings in this application. The present invention may be embodied in other ways. Moreover, it should be understood that the wordings and terms used herein are only for descriptive purposes and should not be interpreted as being restrictive. The wordings "comprise", "include", "have" and other similar words used herein mean to include items listed thereafter, their equivalents and other additional items. In particular, when using "a", "an" or "the" for describing an element, the present invention does not limit the number of the element to one, and multiple elements may also be included.

The present application discloses a movable dense storage and picking device. The movable dense storage and picking device includes a skid-mounted outer cabin, a plurality of bins, an outbound platform, a track assembly, a bin gripping robot, and a picking robot. The skid-mounted outer cabin has a storage area and defines an outbound end. The plurality of bins is located in the storage area, and each bin is used for accommodating goods. The outbound platform is located at the outbound end of the skid-mounted outer cabin. The track assembly is installed within the skid-mounted outer cabin and located above the bins. The bin gripping robot is slidably installed on the track assembly and above the bins to transport the bin containing the ordered goods from the storage area to the outbound platform. The picking robot is located within the skid-mounted outer cabin and is arranged adjacent to the outbound platform to pick the ordered goods from the bin located on the outbound platform. The movable dense storage and picking device may be implemented as an automatic retail vehicle or an exhibition vehicle, which adopts a skid-mounted outer cabin with most of the components installed within the skid-mounted outer cabin, thereby realizing the movable function of the entire warehouse system.

The following describes embodiments of components of the above-mentioned movable dense storage and picking device with reference to the accompanying drawings.

Figure 2:
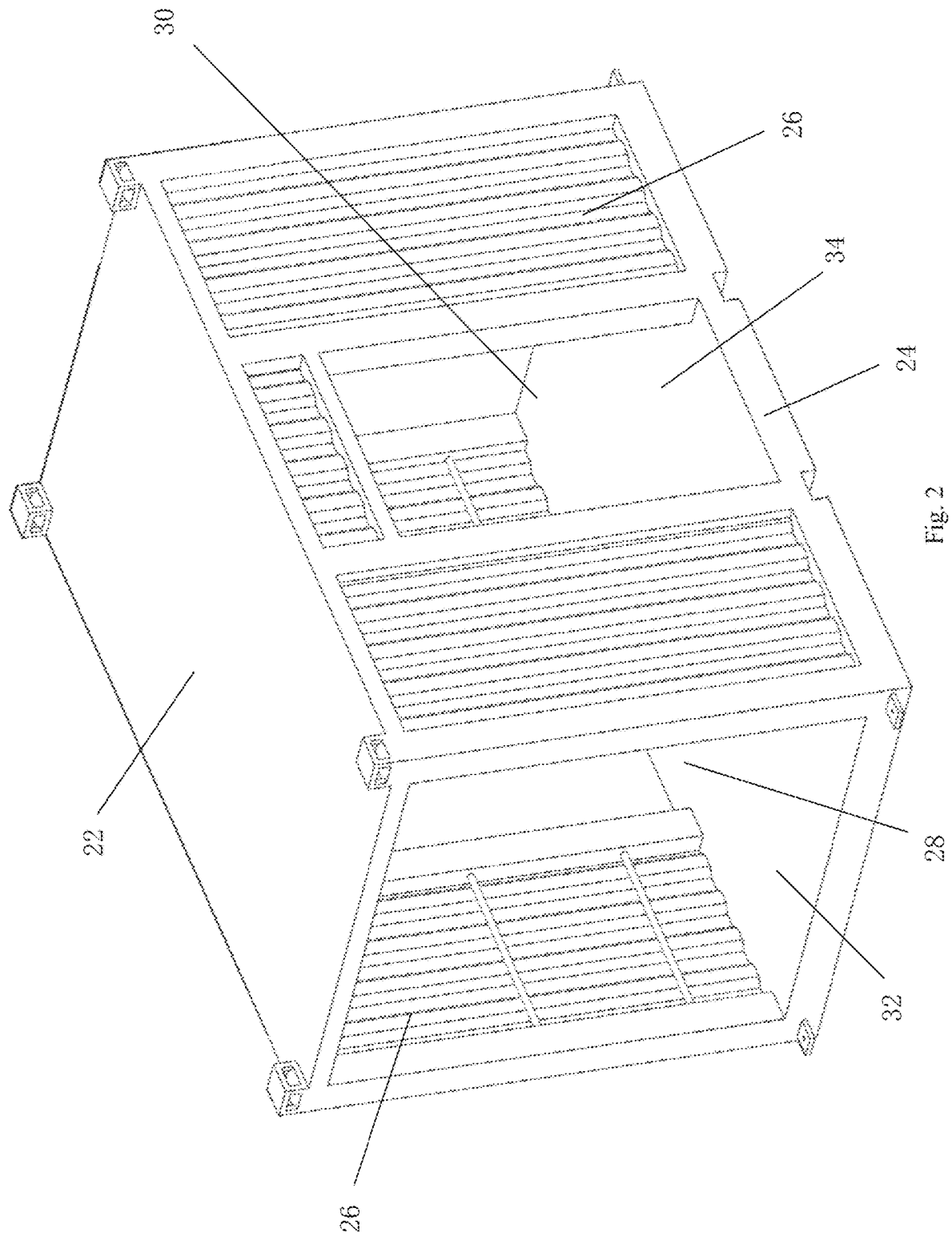
FIG. 2 is a perspective schematic view of a skid-mounted outer cabin of the movable dense storage and picking device of FIG. 1.
Figure 3:
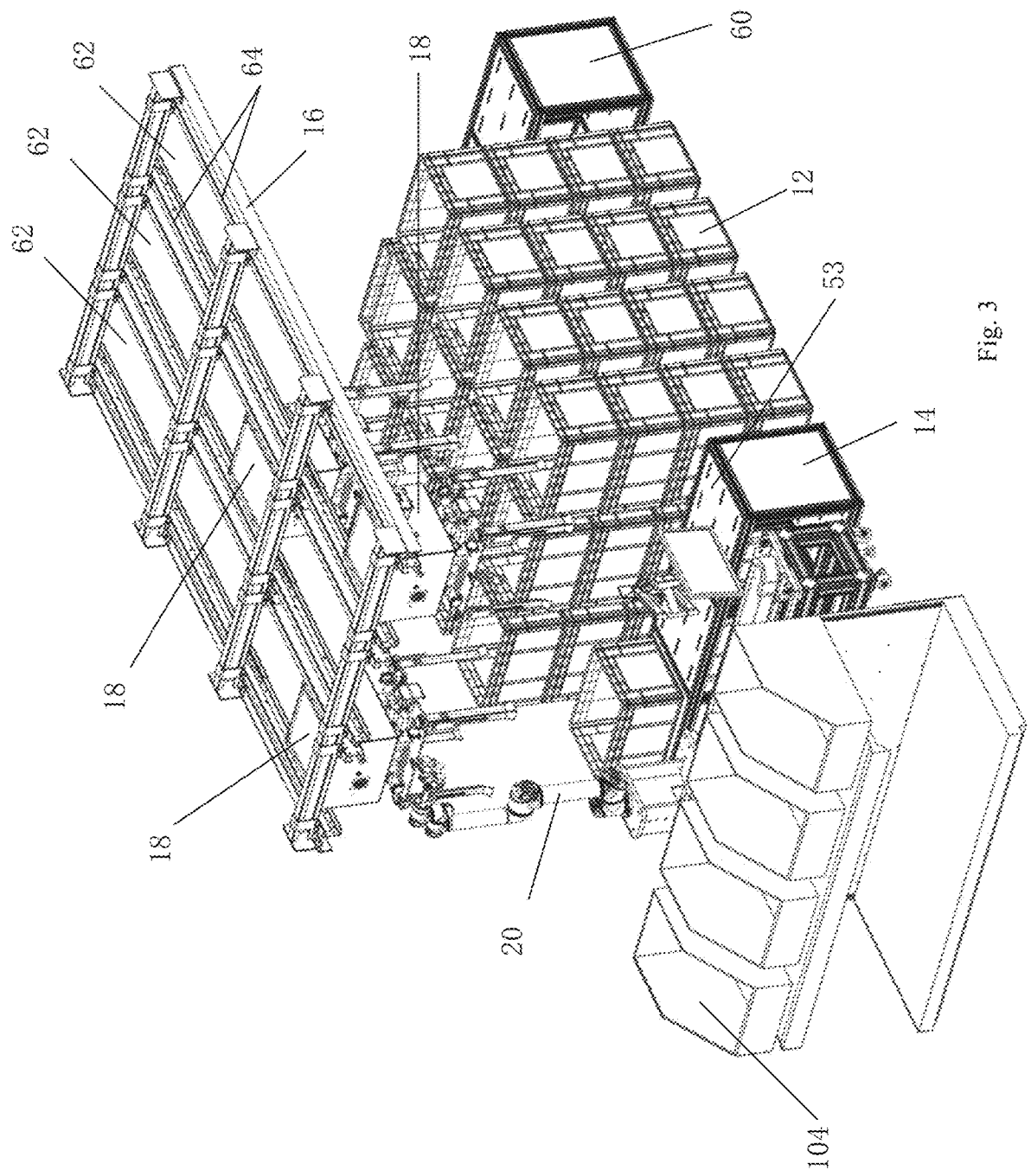
FIG. 3 is a perspective schematic view of the movable dense storage and picking device of FIG. 1 with the skid-mounted outer cabin removed.
Figure 4:
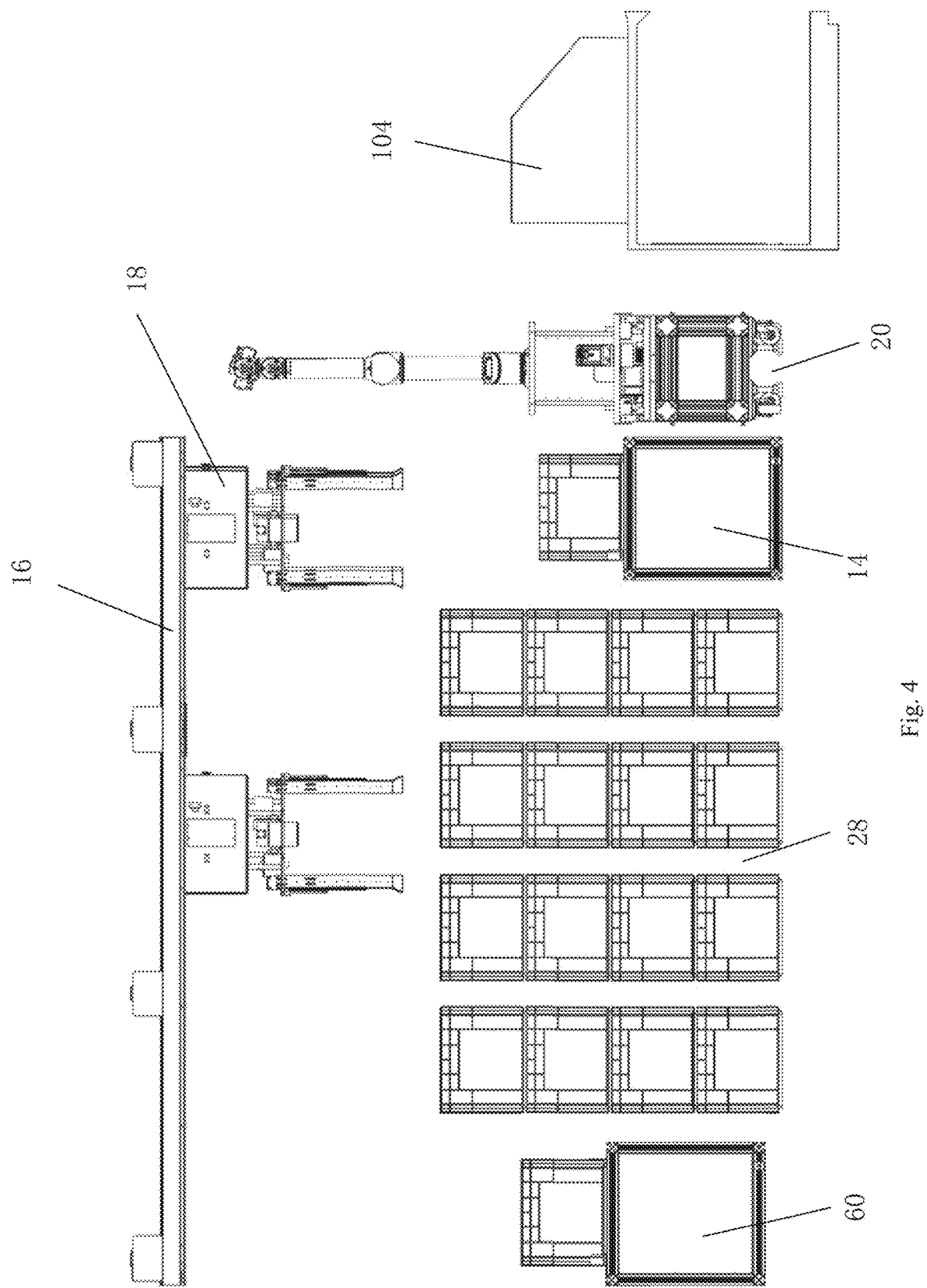
FIG. 4 is a side schematic view of the movable dense storage and picking device of FIG. 3.

FIG. 1 is a perspective view of an embodiment of a movable dense storage and picking device in an assembled state. FIG. 2 is a perspective schematic view of a skid-mounted outer cabin of the movable dense storage and picking device of FIG. 1. FIG. 3 is a perspective schematic view of the movable dense storage and picking device of FIG. 1, with the skid-mounted outer cabin removed to expose internal structures of the movable dense storage and picking device. FIG. 4 is a side schematic view of FIG. 3 showing a general arrangement of internal components of the movable dense storage and picking device.

Referring to FIGS. 1-4, the movable dense storage and picking device includes a skid-mounted outer cabin 10, and a plurality of bins 12, an outbound platform 14, a track assembly 16, and a bin gripping robot 18, and a picking robot 20 that are accommodated in the skid-mounted outer cabin 10.

With reference to FIG. 2, the illustrated skid-mounted outer cabin 10 adopts a container design and includes a top wall 22, a bottom wall 24 and two side walls 26. In this embodiment, the skid-mounted outer cabin 10 defines a storage area 28 therein that has open front and rear ends, with one end (the rear end) defined as an inbound end 30 and the other end (the front end) defined as an outbound end 32. The inbound end 30 is used for inbound operations of goods. Specifically, in this embodiment, the bins containing goods are added to the storage area 28 from the inbound end 30; for example, when a warehouse is built for the first time, the bins containing goods are transported to the storage area 28, or when some of the bins in the storage area 28 are empty, the bins containing goods are added from the inbound end 30 for replacing the empty bins in the storage area 28. The outbound end 32 is used for outbound operations of goods. Specifically, in this embodiment, after a user orders goods located in the storage area 28 (hereinafter referred to as "ordered goods"), the bin 12 containing the ordered goods is transported to the outbound end 32 where the ordered goods is picked out from this bin 12 so that the user can pick it up. When the picking operation is completed, this bin 12 is transported back to the storage area 28.

In order to facilitate the observation of the working status of the storage area 28, a side window 34 may be provided in the side wall 26. The skid-mounted outer cabin 10 may also be equipped with a user interaction interface. For example, the skid-mounted outer cabin 10 is equipped with a display 36, which is in communication with an order system of the movable dense storage and picking device to display a purchase interface to the users such that they may directly purchase goods, or display a QR code to the users such that they may scan and purchase goods by their own terminal devices.

Figure 5:
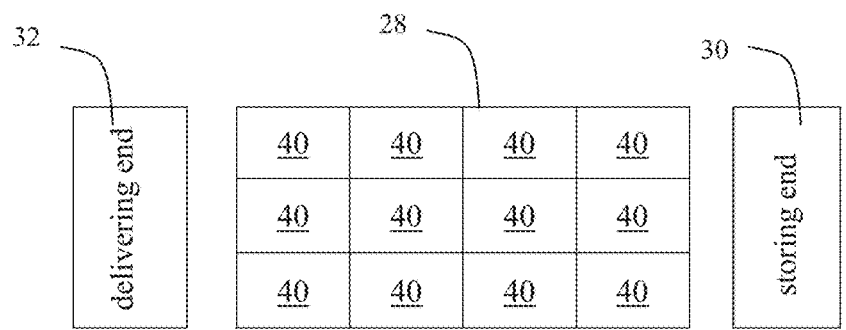
FIG. 5 is a simplified schematic diagram showing an arrangement of bins.

With reference to FIGS. 3, 4 and 5, the plurality of bins 12 may be densely arranged in three dimensions to form a three dimensional warehouse without the need of racks. The bins 12 may be directly stacked on each other to further increase arrangement density of the bins. Specifically, the storage area 28 may have a plurality of bin locations 40 defined by two-dimensional coordinates (see FIG. 5) in horizontal plane, and at each bin location 40 there are several bins 12 stacked in a vertical direction. Therefore, each bin may be identified according to three dimensional coordinates (transverse coordinate, longitudinal coordinate and vertical coordinate). More specifically, the illustrated several bins 12 are divided into three columns in a transverse direction, four rows in a longitudinal direction, and four layers in a vertical direction. Therefore, identification of each bin 12 may be made according to the row, column and layer where the container 12 is located.

In an alternative embodiment, the several bins are arranged in N columns in the horizontal plane, and the track assembly includes N tracks correspondingly located above the N rows of bins. Also, the movable dense storage and picking device may include a transition track perpendicular to the N tracks and a track-switching robot movable on the transition track. The track-switching robot is provided with a docking track that matches a track end of the track assembly. The track-switching robot moves along the transition track to realize the switching of the bin gripping robot among N different tracks. The docking track is aligned with an end of one track of the corresponding track assembly and may be used as an extension of that track, such that the bin gripping robot may move from that track of the track assembly to the docking track, and then move along the transition track by means of the track-switching robot to an end of a next switched track, thereby completing the switching of the bin gripping robot among the N different tracks.

Figure 6:
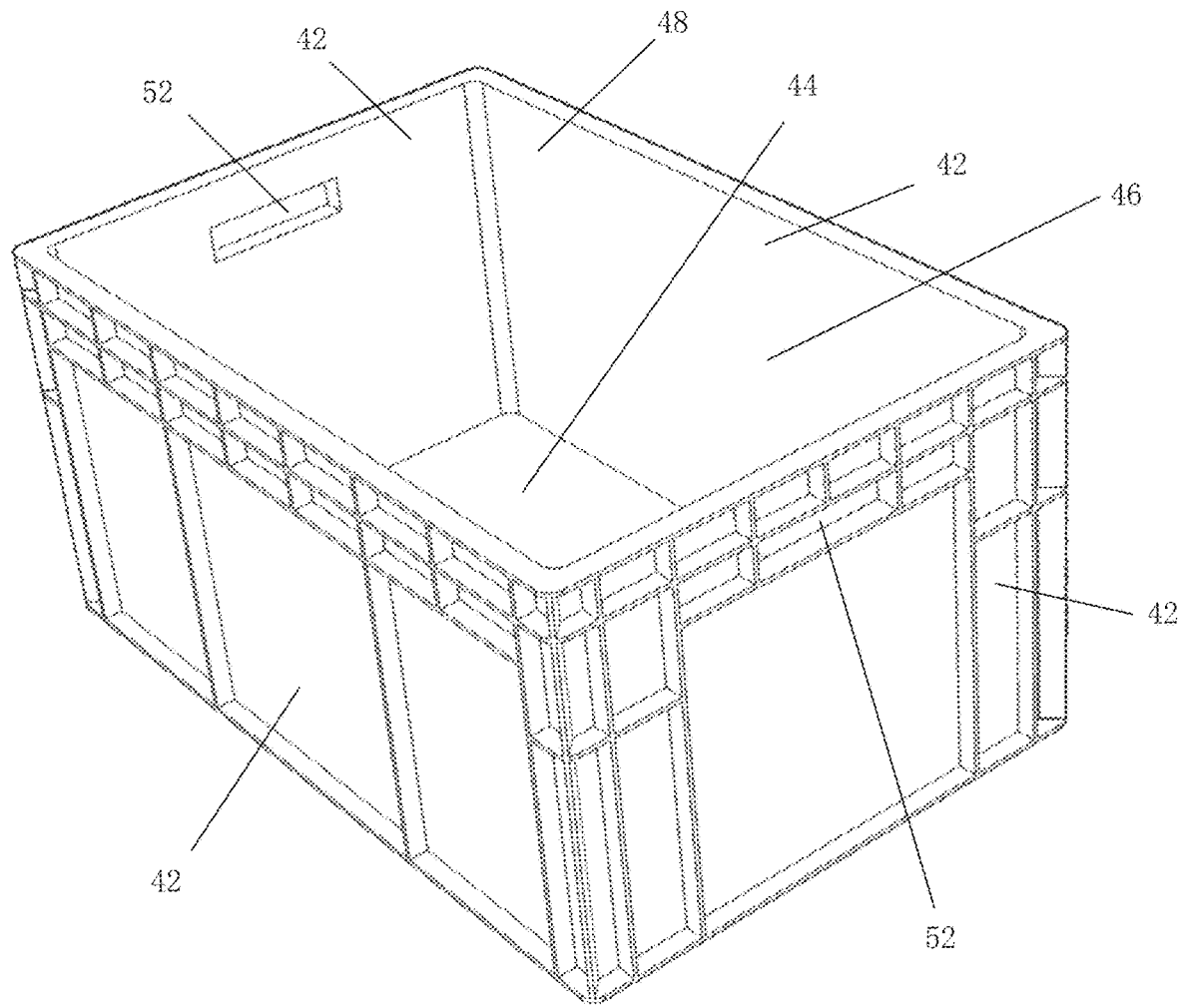
FIG. 6 is a perspective schematic view of a bin.
Figure 7:
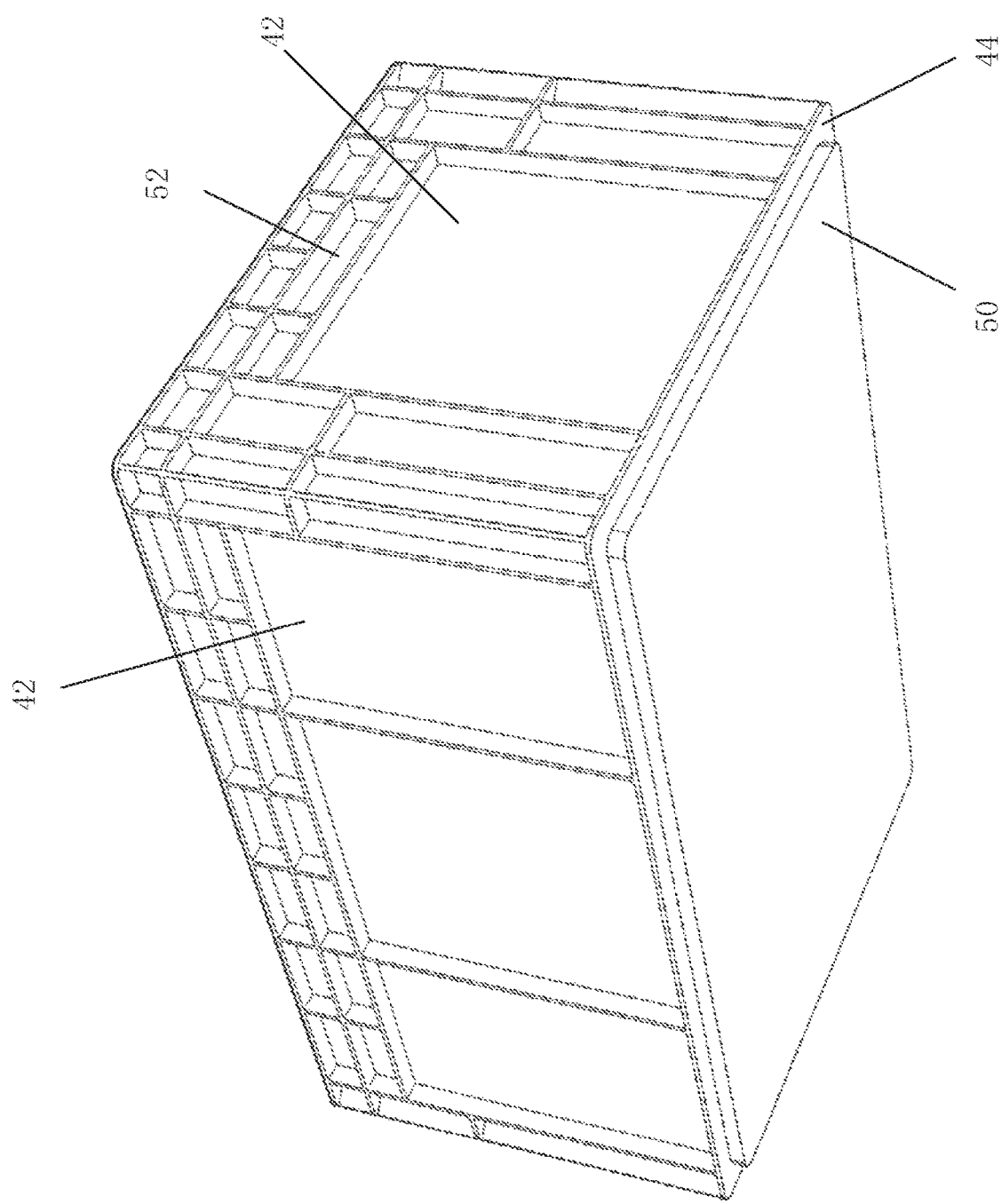
FIG. 7 is a perspective schematic view of the bin viewed from another angle.

FIGS. 6 and 7 are perspective views of an individual bin 12. The bin 12 includes four side walls 42 and a bottom wall 44 that define an accommodating space 46 for accommodating goods, and the bin 12 has an opening 48 facing the bottom wall 44 at an upper end of the bin 12. A boss 50 is formed on a bottom surface of the bottom wall 44. The boss 50 has a shape corresponding to that of the opening 48, such that when several bins 12 are stacked in the vertical direction, the boss 50 of the upper bin 12 is received in the opening 48 of the lower bin 12. Since the boss 50 and the opening 48 have corresponding shapes, the stacked bins 12 will not move relative to each other in the horizontal plane once the boss 50 is received in the opening 48, thereby ensuring that they are stacked neatly in the vertical direction. The illustrated bin 12 has a cuboid shape with four corners when viewed from the top, and both of the opening 48 and the boss 50 have a rectangular shape. However, it should be understood that the shape shown is only an example, and other suitable shapes may also be adopted.

Upper portions of the two opposite side walls 42 of the bin 12 are each provided with a gripping hole 52 for gripping by a gripper of the gripping robot 18 (as described below in conjunction with the figures).

Figure 8:
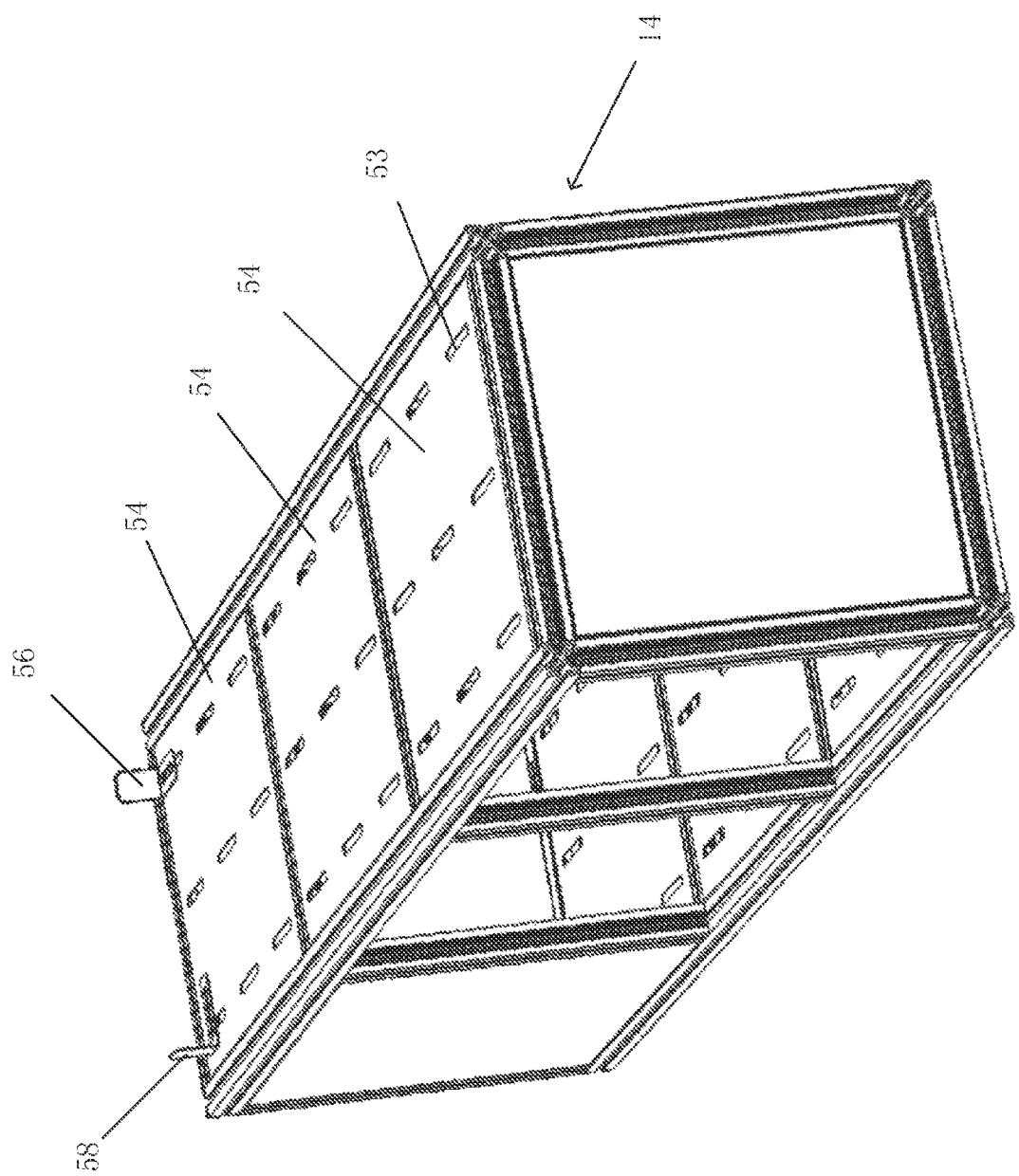
FIG. 8 is a perspective schematic view of an embodiment of an outbound platform.

As shown in FIGS. 3, 4 and 8, the outbound platform 14 is arranged at the outbound end 32 of the skid-mounted outer cabin 10, and is placed on the bottom wall 24 of the skid-mounted outer cabin 10. The outbound platform 14 is used to receive the bins 12 transported from the storage area 28. The outbound platform 14 has a supporting surface 53 for supporting the received bins 12. In order to be able to receive multiple bins 12 at a time, a plurality of outbound locations 54 are provided on the outbound platform 14 with each outbound location 54 occupying a portion of the supporting surface 53. In the illustrated embodiment, the outbound platform 14 is provided with three outbound locations 54. Each outbound location 54 corresponds to one column of bins 12.

In order to enable the bin gripping robot 18 to grip the bin 12 accurately or position the bin 12 accurately, a bin positioning mechanism is provided on the outbound location 54. In the illustrated embodiment, the bin positioning mechanism includes a transverse positioning piece 56 and a longitudinal positioning piece 58 extending vertically upward from the supporting surface 53 of the outbound platform 14, for positioning the bins 12 on the outbound location 54 in the transverse direction and the longitudinal direction, respectively.

The inbound end 30 of the skid-mounted outer cabin 10 is provided with an inbound platform 60, which has similar structure and function to those of the outbound platform 14. In the illustrated embodiment, it is provided with three inbound locations capable of receiving three bins at a time, with each inbound location in positional correspondence with a row of bins 12 placed in the storage area 28. In structural respect, the inbound platform 60 may be the same as the outbound platform 14, so it will not be repeated here. During operating, it is necessary to transport the bin 12 containing goods to the inbound location manually or by means of the other mechanisms, and then transport this bin to the storage area 28 by the bin gripping robot 16.

As an alternative embodiment, an outbound-inbound container is provided at outbound end. The outbound-inbound container includes an outbound-inbound container body, and a goods conveying device, the outbound platform and the picking robot that are located within the outbound-inbound container body. The outbound-inbound container body includes a top plate, a bottom plate, and detachable side plates connected between the top plate and the bottom plate. The outbound-inbound container body of the outbound-inbound container is perpendicular to the plurality of skid-mounted outer cabins arranged in parallel in a horizontal direction and located in the same layer as this outbound-inbound container, and their internal spaces are communicated with each other. The internal space of the outbound-inbound container is communicated with the outbound end of each skid-mounted outer cabin.

In another alternative embodiment, an outbound-inbound container is provided at the position of the inbound end 30, and includes an outbound-inbound container body, and a goods conveying device, the inbound platform and the picking robot that are located within the outbound-inbound container body. The outbound-inbound container body includes a top plate, a bottom plate, and detachable side plates connected between the top plate and the bottom plate. The outbound-inbound container body of the outbound-inbound container is perpendicular to the plurality of skid-mounted outer cabins arranged in parallel in a horizontal direction and located in the same layer as this outbound-inbound container, and their internal spaces are communicated with each other.

It should be noted that the outbound-inbound container at the inbound end and the outbound-inbound container at the outbound end may be formed as identical standardized containers. In different embodiments, it is possible to include the outbound-inbound container only at one end of the skid-mounted outer cabin, i.e., both goods outbound-inbound functions may be realized by the outbound-inbound container arranged at one end of the skid-mounted outer cabin; or it is also possible to include the outbound-inbound container located at each end of the skid-mounted outer cabin to realize the goods outbound-inbound functions respectively. It should also be noted that, depending on internal settings of each outbound-inbound container, each outbound-inbound container may have only the outbound function, only the inbound function, or both the outbound and inbound functions.

In the above solution of forming the assemblies at the outbound end and the inbound ends as separate outbound-inbound containers, the picking robot and the outbound/inbound platform may not be arranged within the skid-mounted outer cabin; instead, they may be arranged within the outbound-inbound containers. When building a storage system, a user only needs to select the required number of modular storage container(s) and modular outbound-inbound container(s) and then combine them in a preset manner. Such a modular building manner will be discussed in more detail later in this disclosure.

Figure 9:
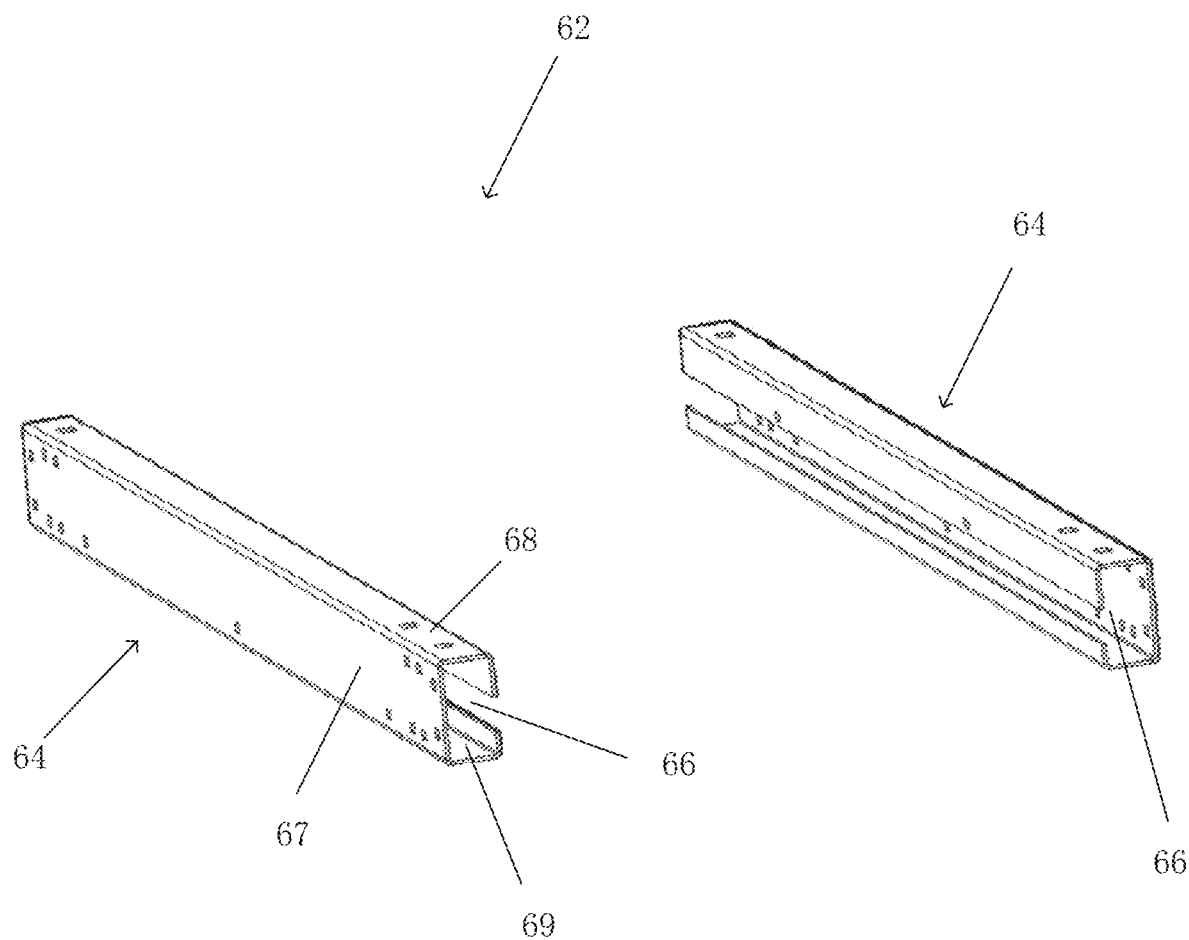
FIG. 9 is a partial schematic view of a track unit of a track assembly.

As shown in FIGS. 3, 4 and 9, the track assembly 16 is installed within the skid-mounted outer cabin 10 and located above the bins 12 of the storage area 28. In the illustrated embodiment, the track assembly 16 includes three track units 62 that are correspondingly located above the three columns of bins 12, with each track unit slidably installed with one bin gripping robot 18. Therefore, in the illustrated embodiment, there are three bin gripping robots 18 in total, and each bin gripping robot 18 corresponds to one column of bins 12.

In the above embodiment, there are three columns of bins 12, three outbound locations 54, three inbound locations, three track units 62, and three bin picking robots 18, which correspond to each other. In other embodiments, there may be N columns of bins 12, N outbound locations 54, N inbound locations, N track units 62, and N bin picking robots 18, which correspond to each other, where N is an integer greater than or equal to one. In other embodiments, the number of columns of the bin 12, the number of the outbound locations 54, the number of the inbound locations, the number of the track units 62, and the number of the bin picking robots 18 may not correspond to each other, but may be chosen based on the actual situation.

As shown in FIG. 9, it is a schematic view of a partial structure of one of the track units 62. The track unit 62 includes two rails 64 spaced apart in the transverse direction. Each rail 64 is provided with a rail groove 66, and the rail grooves 66 of the two rails 64 of the same track unit 62 are opposed to each other, for cooperating with the bin gripping robot 18. Each rail includes a side wall 67, and a top wall 68 and a bottom wall 69 extending from upper and lower edges of the side wall 67 toward the other rail 64, respectively, with the side wall 67, the top wall 68 and the bottom wall 69 cooperatively forming a C-shaped cross section.

Figure 10:
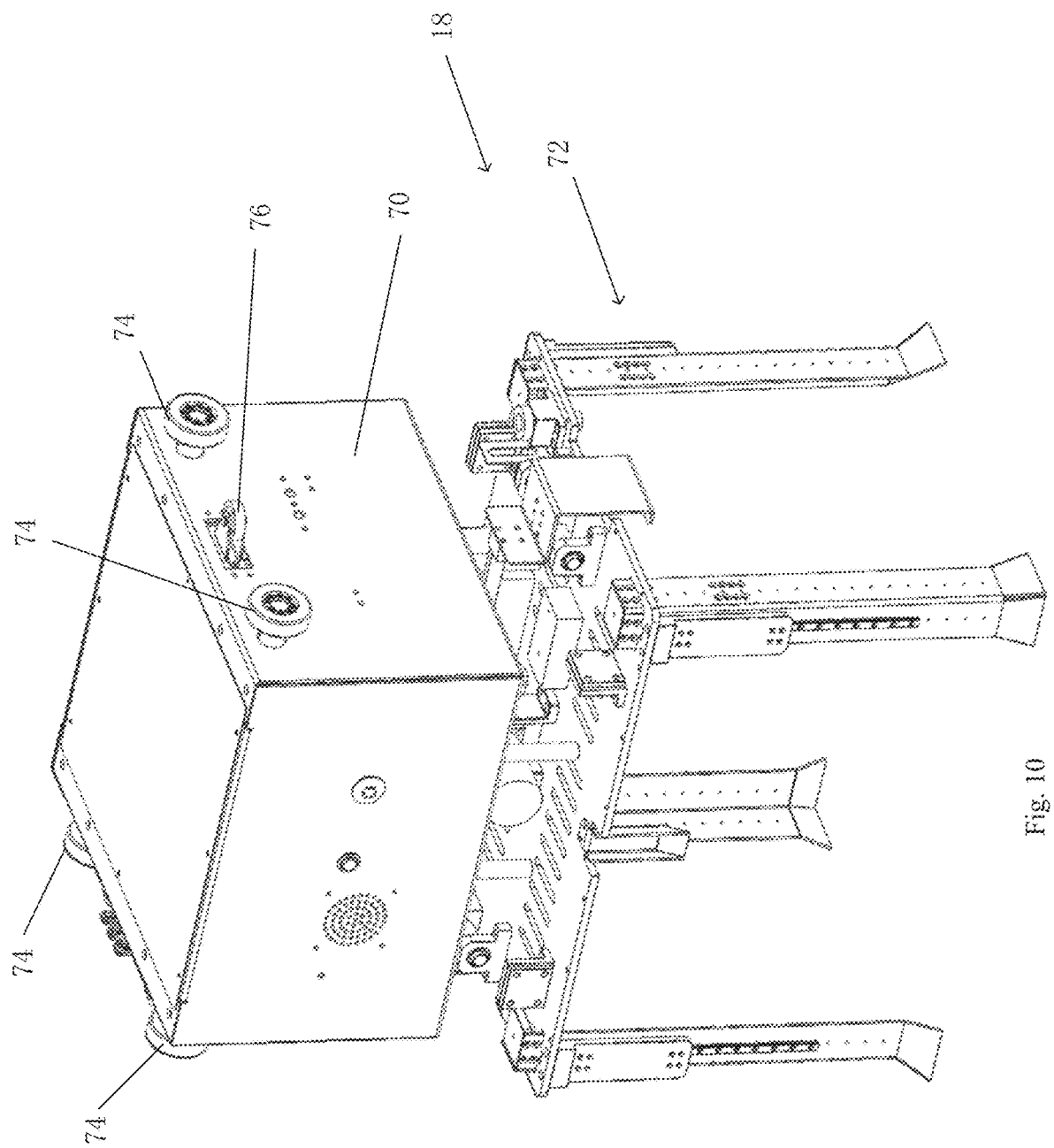
FIG. 10 is a perspective schematic view of a bin gripping robot of the movable dense storage and picking device of FIG. 3.

As shown in FIGS. 3, 4 and 10, the bin gripping robot 18 includes a moving mechanism 70, and a gripping mechanism 72 that is suspended under the moving mechanism 70 and can be raised and lowered relative to the moving mechanism 70. The moving mechanism 70 is slidably mounted on the track assembly 16 so as to move horizontally along the track assembly 16 to drive the gripping mechanism 72 to move horizontally. The moving mechanism 70 is provided with moving rollers 74 and guide wheels 76 on opposite sides thereof, and provided with an internal driving device for driving the moving rollers 74 to roll. Four moving rollers 74 are arranged on the opposite sides of the moving mechanism 70 respectively, with two moving rollers on each side. Two moving rollers 74 on one side move on the bottom wall 69 of one of the rails 64 of the track unit 62, while two moving rollers 74 on the other side move on the bottom wall 69 of the other rail 64 of the track unit 62. The guide wheels 76 on the opposite sides move on the side walls 67 of the two rails respectively. The moving roller 74 is driven by the internal driving device, such that the moving mechanism 70 can move in the longitudinal direction along the rails.

Under the driving of the driving device, the four moving rollers 74 obtain power synchronously to move in the track unit, such that a load of the bin gripping robot 18 is relatively evenly distributed to the four moving rollers 74. As the moving roller 74 moves in the track unit, the roller may contact the side wall 67 of the rail. The guide wheel 76 is provided to avoid such contact. By providing the guide wheel 76, the moving roller 74 and the side wall 67 of the rail may remain spaced apart from each other stably, which may reduce or control shaking of the vehicle body, thereby increasing the stability of the vehicle body, and avoiding the unfavorable shaking of the bin 12 under the bin gripping robot 18.

Figure 11:
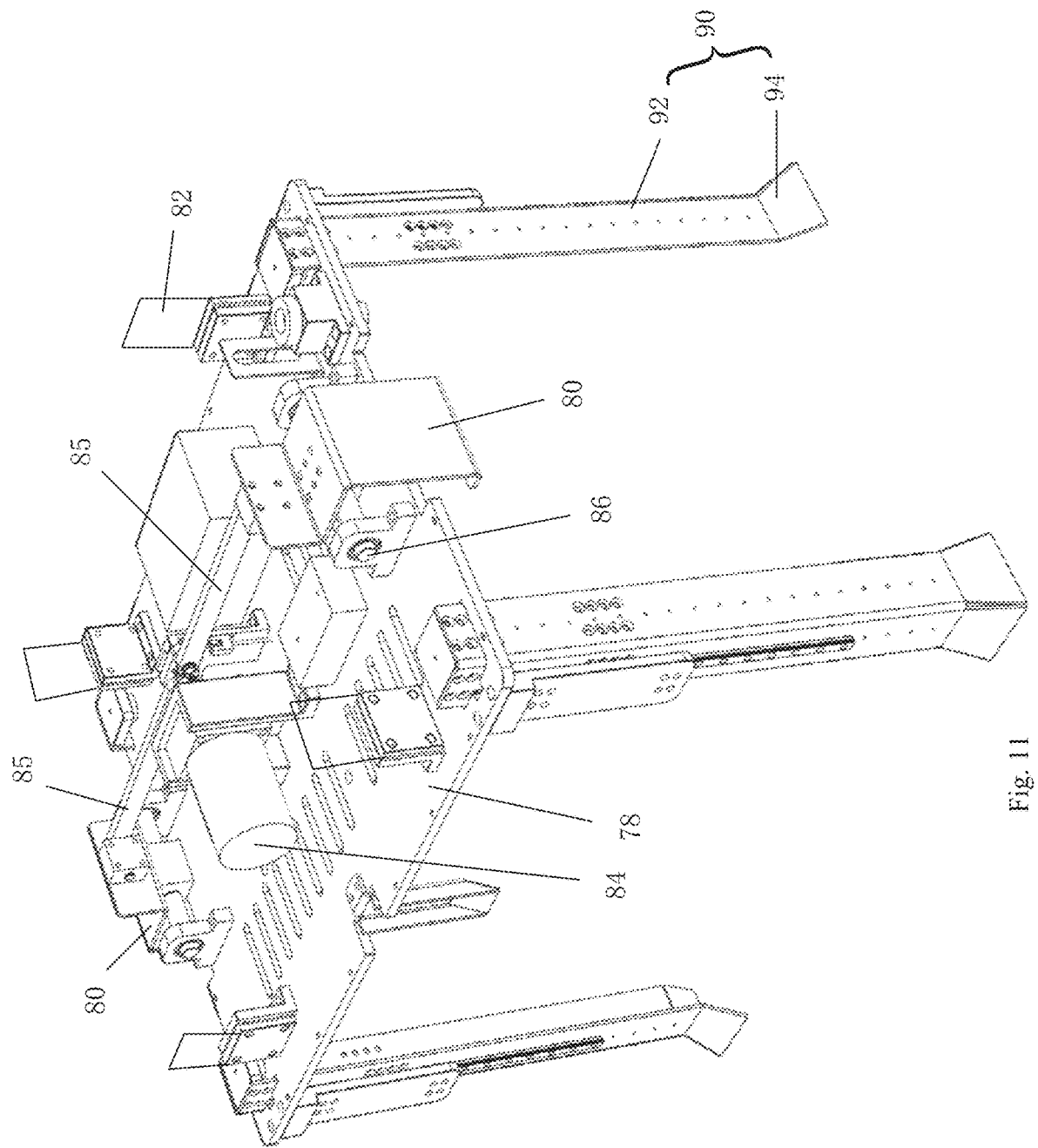
FIG. 11 is a perspective schematic view of a gripping mechanism of FIG. 10.

As shown in FIG. 11, the gripping mechanism 72 includes a gripper platform 78, grippers 80, and an alignment mechanism.

A lifting mechanism is provided between the gripper platform 78 and the moving mechanism 70 for lifting and lowering the gripper platform 78. In the illustrated embodiment, the lifting mechanism includes lifting bars 82 and a lifting drive device. An upper end of each lifting bar 82 is connected with the lifting driving device, and a lower end of each lifting bar 82 is fixed to the gripper platform 78. The lifting and lowering of the gripper platform 78 can be achieved by lifting the lifting bar 82 upwards or lowering the lifting bar 82 downwards under the driving of the lifting drive device. In the illustrated embodiment, the lifting drive device is arranged within the moving mechanism 70, and includes a drive motor and a winder connected to the drive motor. The upper end of the lifting bar 82 is wound on the winder, and the drive motor drives the winder to perform winding/unwinding operations, so as to realize the lifting and lowering actions of the lifting bar 82. The lifting bar 82 may be a flexible steel bar or steel rope or the like.

The grippers 80 are arranged on side edges of the gripper platform 78, for gripping the side walls 42 of the bin 12. In the illustrated embodiment, two grippers 80 are provided on opposite sides of the gripper platform 78 respectively, for gripping two gripping holes 52 formed on the bin 12. The gripper platform 78 is also provided with a gripper driving device for driving each gripper 80 to rotate around a rotation axle 86 between a gripping position and a releasing position. In the gripping position, the gripper 80 rotates to extend into the gripping hole 52, and in the releasing position, the gripper 80 rotates outward to exit from the gripping hole 52. The gripper drive device can be implemented in any suitable form. In the illustrated embodiment, the gripper driving device includes a motor 84 and a linkage mechanism driven by the motor, with one of links 85 of the linkage mechanism connected to the upper end of the gripper 80. When the motor 84 drives the linkage mechanism to move, the link 85 will drive the gripper to rotate around the rotation axle 86 between the gripping position and the releasing position.

Figure 12:
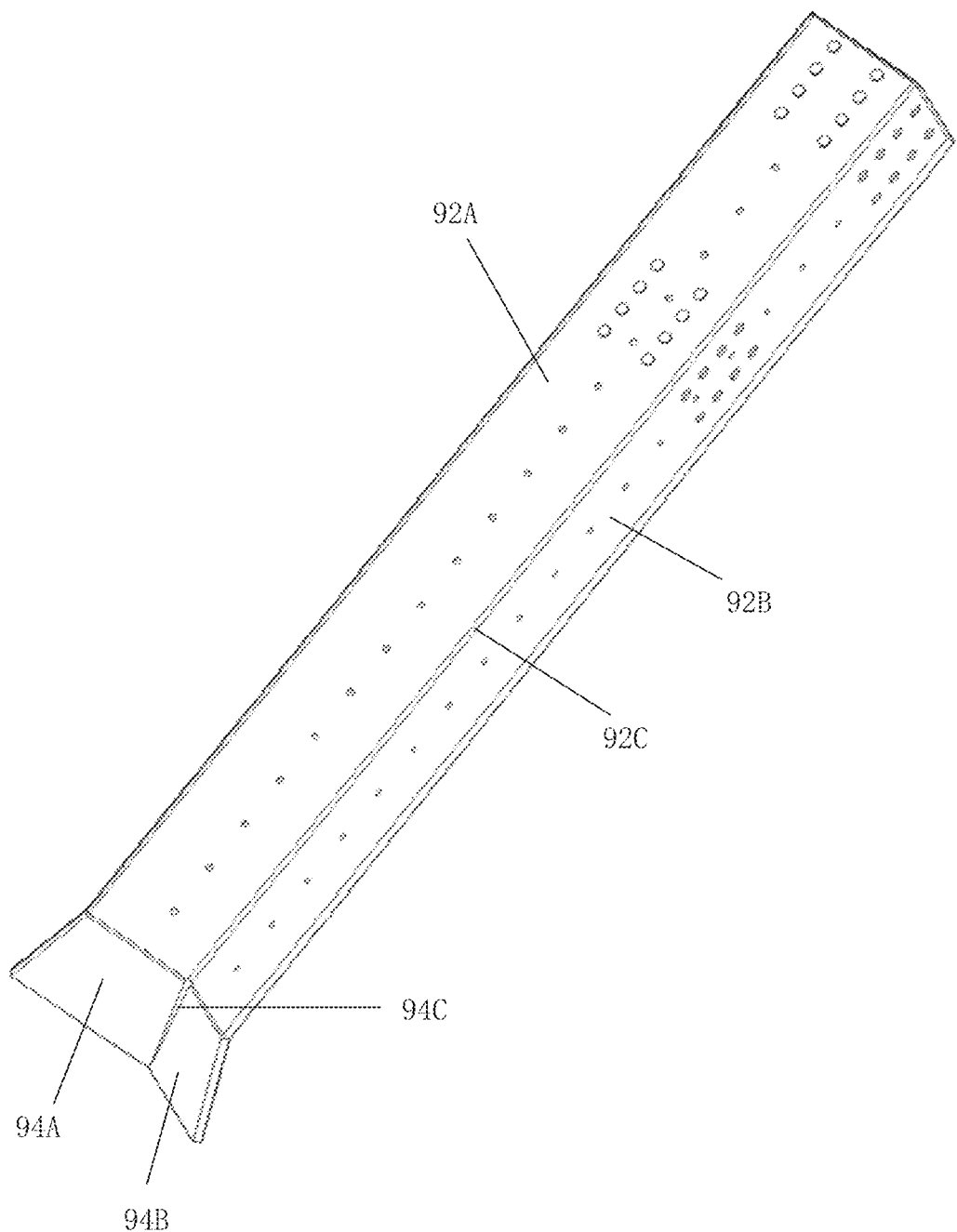
FIG. 12 is a perspective schematic view of an alignment member of the gripping mechanism of FIG. 11.
Figure 13:
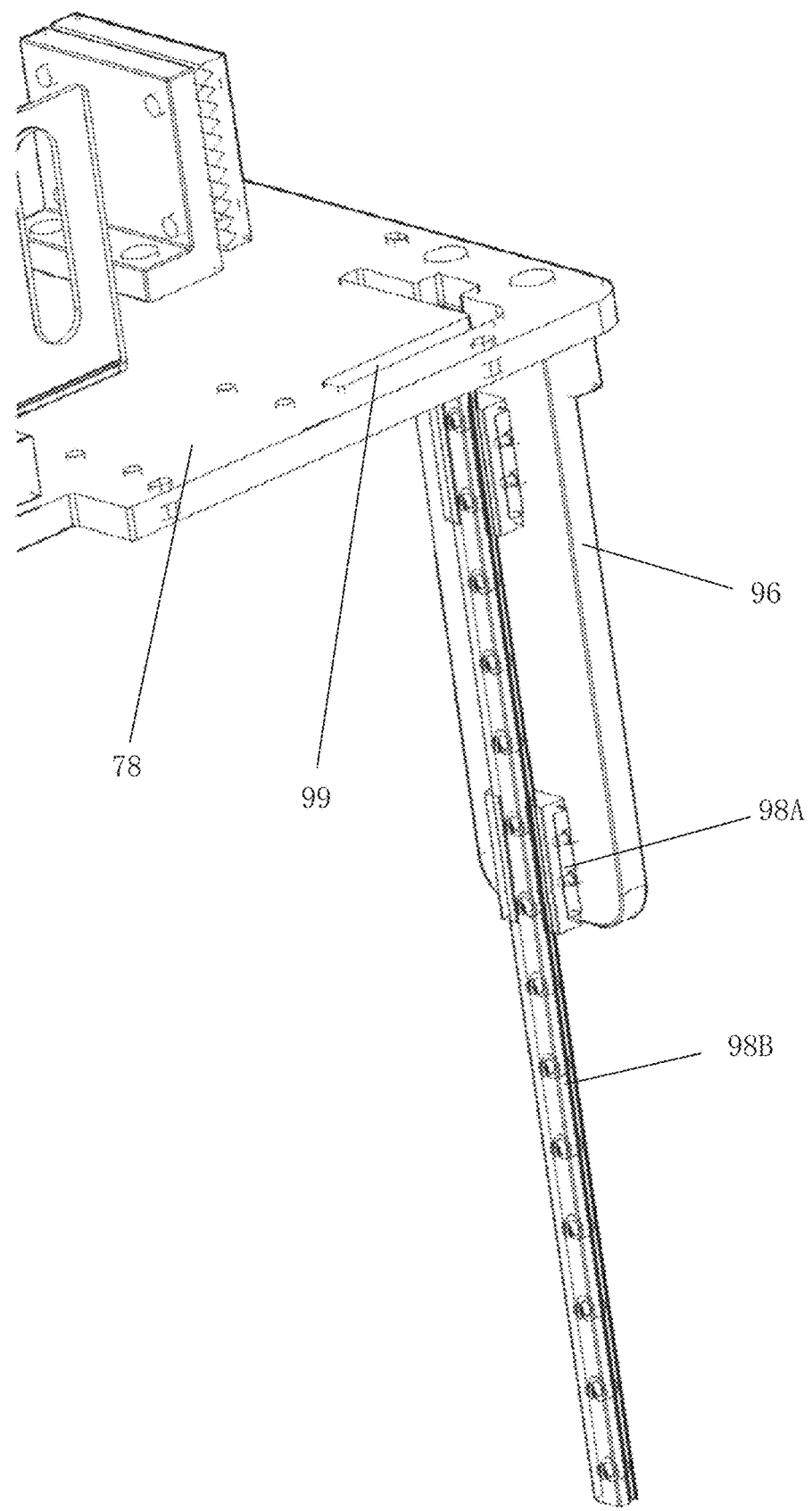
FIG. 13 is a partial perspective schematic view of the alignment member of the gripping mechanism of FIG. 11.

Referring to FIGS. 12 and 13 together, the alignment mechanism includes a plurality of alignment members 90 arranged at corners of the gripper platform 78. In the illustrated embodiment, there are four alignment members 90 that correspond to the four corners of the bin 12 respectively. Each alignment member 90 includes a vertical extension 92 extending vertically downward and an alignment slope 94 extending downward and outward from a bottom end of the vertical extension 92. When the gripping mechanism 72 grips one of the bins 12, the vertical extensions 92 of all alignment members 90 closely contact the outer surfaces of the side walls of the bin 12 and have an extension length such that all of the alignment slopes 94 are located below the bottom of the gripped bin 12. During stacking the gripped bin 12 on a lower bin 12, if the gripped bin 12 and the lower bin 12 are not aligned with each other, the boss 50 of the gripped bin 12 will be misaligned with the opening 48 of the lower bin 12, and thus normal stacking cannot be performed. At this time, the alignment slope 94 will be in sliding contact with an upper edge of the side wall of the lower bin 12, thereby finely adjusting the position of the upper bin 12 in a horizontal plane, so that the gripped bin 12 become aligned with the lower bin 12. In the present application, the alignment mechanism is provided on the gripping mechanism 72 to achieve precise alignment in the vertical direction, and there is no need to provide a high-cost position detection mechanism on the bin gripping robot 18, thereby effectively reducing costs.

In the illustrated embodiment, the vertical extension 92 of each alignment member 90 includes a first alignment plate 92A and a second alignment plate 92B. The first alignment plate 92A and the second alignment plate 92B are perpendicular to each other, such that the alignment member 90 has an L-shaped shape in a cross section parallel to the horizontal plane. The first alignment plate 92A and the second alignment plate 92B are arranged to closely contact the outer surfaces of two adjacent side walls of the gripped bin 12, that is, the outer surfaces of two adjacent side walls that form one of the corners. Correspondingly, the alignment slope 94 includes a first alignment slope 94A extending downward and outward from a bottom end of the first alignment plate 92A, and a second alignment slope 94B extending downward and outward from a bottom end of the second alignment plate 92B.

The first alignment slope 94A and the second alignment slope 94B of each alignment member 90 intersect with each other or define a small gap therebetween (the latter situation can be regarded as "intersecting"). For each alignment member 90, the first alignment plate 92A and the second alignment plate 92B have a first intersection line 92C, and the first alignment slope 94A and the second alignment slope 94B have a second intersection line 94C, such that the first intersection line 92C and the second intersection line 94C are located in the same vertical plane. In this way, the relative positions of the upper and lower bins 12 may be successfully corrected by means of the first alignment slope 94A and the second alignment slope 94B.

The alignment mechanism is provided with an installation member 96 fixed to the gripper platform 78, corresponding to each alignment member 90. The alignment member 90 is installed to the gripper platform 78 by use of the installation member 96.

When the gripping mechanism 72 grips one bin and transports it to a certain bin location, the bin may be placed on another bin (that is, the bin will be located above the first layer in the vertical direction), or it may be placed directly on a platform or ground (that is, the bin will be located in the first layer in the vertical direction). If the latter is the case, the alignment member 90 will firstly contact the platform or the ground, which results in that the gripped bin cannot contact the platform or ground since the alignment member 90 has contacted the platform or ground. If the gripper 80 is hurriedly released at this time, the bin 12 will fall on the platform or ground such that the goods in the bin 12 may be damaged. Therefore, in the present application, a slide track assembly is provided between the installation member 96 and the alignment member 90, so that the alignment member 90 may slide upward under the action of the counterforce from the platform or ground, and the bin 12 may land slowly. As mentioned above, during stacking the gripped bin 12 on the lower bin 12, if the gripped bin 12 and the lower bin 12 are not aligned with each other, the alignment slope 94 of the alignment member 90 will be in sliding contact with the upper edge of the side wall of the lower bin 12, and at this time, the upper edge of the side wall of the lower bin 12 will exert an upward inclined force on the alignment slope 94. In order to prevent the alignment member 90 from sliding upward by the force, the damping force of the slide track assembly is designed to be greater than the vertical component force of the inclined force exerted by the lower bin on the alignment slope 94 in the present application.

Referring to FIG. 13, the alignment member 90 is removed from the drawing to more clearly show the installation member 96 and the slide track assembly. The installation member 96 extends vertically downward from the gripper platform 78. The slide track assembly includes a first guide rail 98A fixed to the installation member and a second guide rail 98B fixed to the alignment member 90, and the first guide rail 98A is slidingly fitted with the second guide rail 98B. In the illustrated embodiment, the first guide rail 98A includes two protrusions, each of which defines a guide groove on a surface facing the second guide rail 98B, and the second guide rail 98B is slidably received in the guide grooves of the two protrusions. Moreover, the gripper platform 78 is provided with an installation hole 99, corresponding to each alignment member 90, such that the alignment member 90 is slidably installed in the installation hole 99. In the illustrated embodiment, the installation hole 99 is L-shaped.

Figure 14:
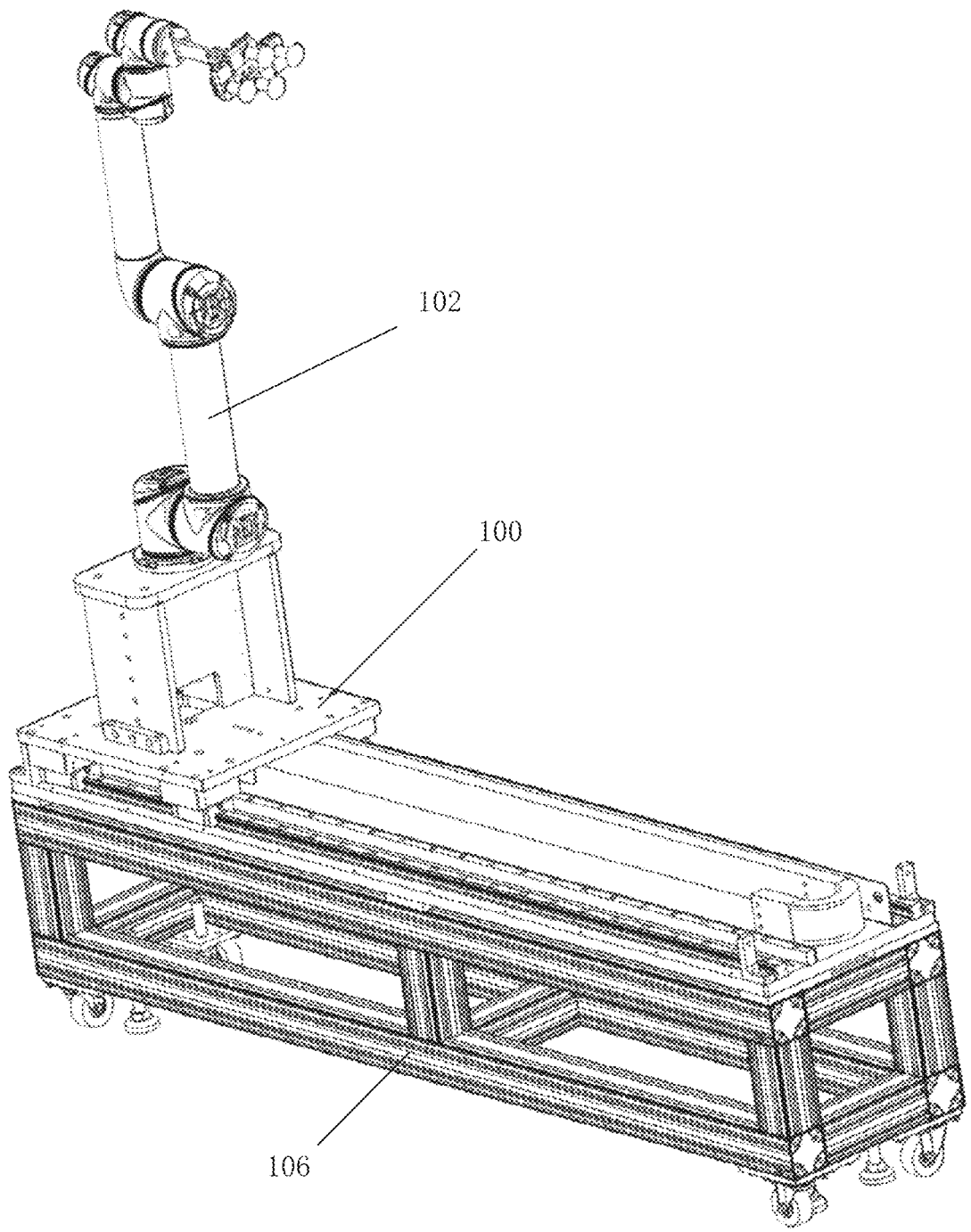
FIG. 14 is a perspective schematic view of a picking robot of the movable dense storage and picking device of FIG. 3.
Figure 15:
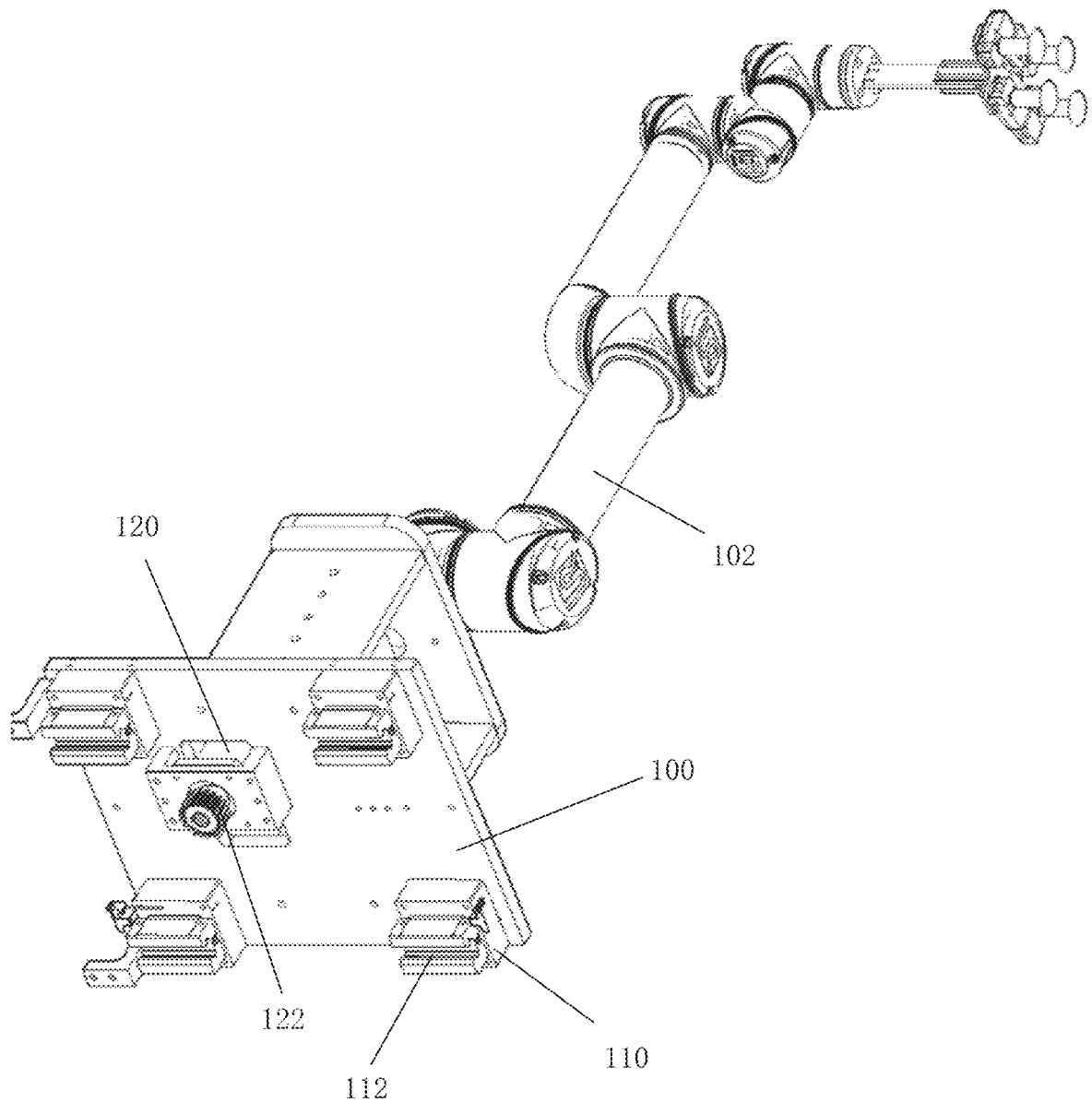
FIG. 15 is a perspective schematic view of the picking robot of FIG. 14 with a fixing base removed.
Figure 16:
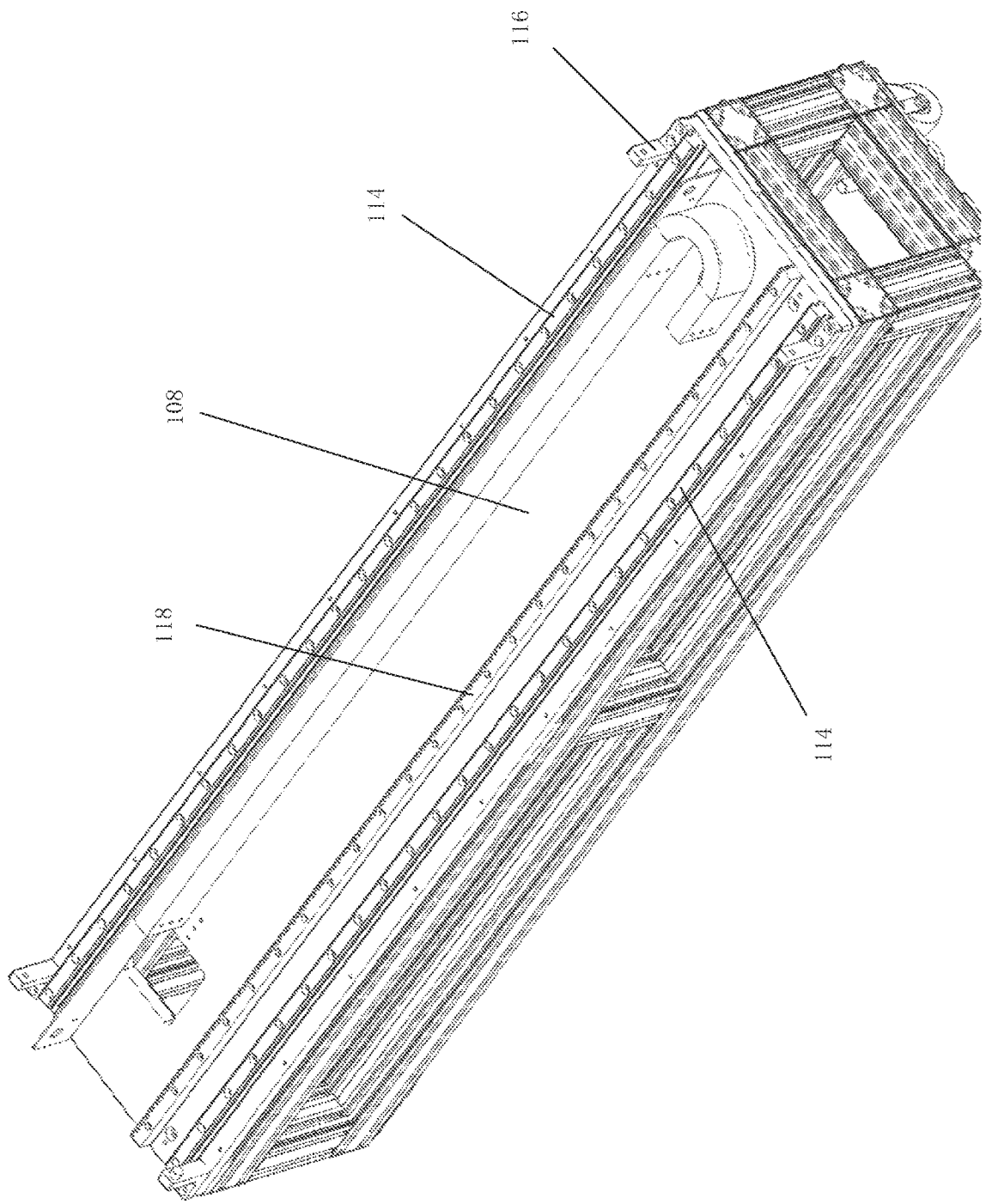
FIG. 16 is a perspective schematic view of the fixing base of the picking robot of FIG. 14.

Also referring to FIGS. 14-16, the picking robot 20 includes a movable base 100 and a manipulator 102. The movable base 100 is movable relative to the bin 12. The manipulator 102 is supported by the movable base 100 so as to be movable together with the movable base 100. The manipulator 102 is used to pick the ordered goods contained in the bin and bring them to at least one delivering port 104 (FIG. 1 and FIG. 3). After a user places an order, the bin 12 containing the ordered goods will be transported to the outbound location 54 of the outbound platform 14 by the bin gripping robot 18, and then the manipulator 102 picks the ordered goods from the bin 12 and bring it to the delivering port 104 so that the user may pick it up.

As mentioned above, the outbound platform 14 has a plurality of outbound locations 54, with each outbound location 54 used to receive one bin 12. The movable base 100 is movable along a direction in which these outbound locations 54 are arranged. Therefore, if the bin 12 containing the ordered goods is far away from the manipulator 102, the movable base 100 may slide toward the bin 12 to facilitate the pick operation without lengthening the manipulator 102.

The picking robot 18 is located within the skid-mounted outer cabin 10, and its movable base 100 is movably supported on a fixing base 106, which is fixedly disposed within the skid-mounted outer cabin 10 at a position adjacent to the outbound platform 14. The fixing base 106 is provided with a support stage 108. One of the support stage 108 and the movable base 100 is provided with at least one guiderail, and the other of the support stage 108 and the movable base 100 is provided with at least one guide groove, such that the guide rail is slidably received in the guide groove. In this way, the movement of the movable base 100 on the fixing base 106 may be realized.

In the illustrated embodiment, at least one protruding block 110 is provided on each side of the bottom surface of the movable base 100, and each protruding block 110 is provided with a groove 112 which forms the guide groove. As shown in FIG. 15, the bottom surface of the movable base 100 is provided with four protruding blocks 110, the grooves 112 defined in two of these protruding blocks 110 form one guide groove, and the grooves 112 defined in the other two protruding blocks 110 form the other guide groove. Accordingly, two guide rails are fixedly installed on the support stage 108 of the fixing base 106. A stop 116 is also provided at each of four corners of the support stage 108 to limit the movement of the movable base 100.

A rack 118 is provided on the support stage 108, and the rack 118 is parallel to the moving direction of the picking robot 20. A motor 120 is provided on the movable base 100, and a gear 122 is fixedly provided on an output shaft of the motor 120 such that the gear 122 is rotatable with the output shaft. The gear 122 meshes with the rack 118. When the gear 122 is driven to rotate by the motor 120, the gear 122 will travel along the rack 118, thereby driving the movable base 100 to move. Of course, the solution of using gear and rack engagement is illustrative only, and other suitable driving solutions may be adopted for the movable base 100 in other embodiments.

In the illustrated embodiment, as shown in FIGS. 1 and 3, there are four delivering ports 104. In other embodiments, it is possible to provide a different number of delivering ports 104, which is not limited in this application.

In addition, in the illustrated embodiment, the picking robot 18 is located between the outbound platform 14 and the delivering port 104, and the delivering port 104 is provided outside the skid-mounted outer cabin 10. In other embodiments, the delivery port 104 may also be provided inside the skid-mounted outer cabin 10.

Through the above discussion about the picking robot 18, this application also discloses a goods picking assembly of an automatic warehouse system, which includes:

at least one bin 12 for containing goods;

at least one delivering port 104 (for example, four delivering ports as shown) for receiving a piece of goods from the at least one bin 12;

a picking robot 18 including:
  a movable base 100 which is movable relative to the bin 12; and
  a manipulator 102 supported by the movable base so as to be movable with the movable base 100, the manipulator 102 configured to pick ordered goods from the bin 12 and place the picked goods to the delivering port 104.

The goods picking assembly of the automatic warehouse system as described above may be applied to the movable dense storage and picking device as shown, and in other embodiments, it may also be applied to other automatic storage systems.

In summary, the above-mentioned embodiments of the present invention provide a movable dense storage and picking device, which includes: a skid-mounted outer cabin, a plurality of bins, an outbound platform, a track assembly, and a bin gripping robot and a picking robot. The skid-mounted outer cabin has a storage area and defines an outbound end therein. The plurality of bins is located in the storage area for accommodating goods. The outbound platform is located at an outbound end of the skid-mounted outer cabin. The track assembly is installed within the skid-mounted outer cabin and located above the bins. The bin gripping robot is slidably installed on the track assembly and located above the bins, for transporting the bin containing ordered goods from the storage area to the outbound platform. The picking robot is located within the skid-mounted outer cabin and is arranged adjacent to the outbound platform, for picking ordered goods from the bins located on the outbound platform. The movable dense storage and picking device may be realized as an automatic vending truck or an exhibition truck, which adopts a skid-mounted outer cabin such that most of the components are installed within the skid-mounted outer cabin, thereby realizing the movable function of the entire storage system. In addition, it is possible to achieve a precise alignment in a vertical direction by providing an alignment mechanism for a gripping mechanism of the bin gripping robot, and there is no need to provide a high-cost position detection mechanism on the bin gripping robot, thereby effectively reducing costs. Moreover, the slidable design of the picking robot can improve the picking operation without lengthening the manipulator.

It should be noted that the components for storage and picking of the bins in the above-mentioned movable dense storage and picking device may also be formed as standardized and independent containers. For example, the outer cabin, the bin, the track assembly, and the bin gripping robot may together form a standardized and independent storage container; the outbound-inbound platform and the picking robot may together form a standardized and independent outbound-inbound container; and track-switching components, such as, the track-switching robot and the transition track, may together form a standardized and independent track-switching container, so that a corresponding number of containers may be selected and combined based on a capacity requirement of the required warehouse system. It is also possible to integrate the components in the outbound-inbound container and the components in the track-switching container into a single container based on the actual situation. It is also possible not to provide the track-switching components, or to integrate the track-switching components into the outbound-inbound container.

Please refer to FIGS. 17 to 20, which show a modular warehouse system according to an embodiment of the present invention, including a plurality of storage containers 200, at least one track-switching container 202, and at least one outbound-inbound container 204.

Figure 17:
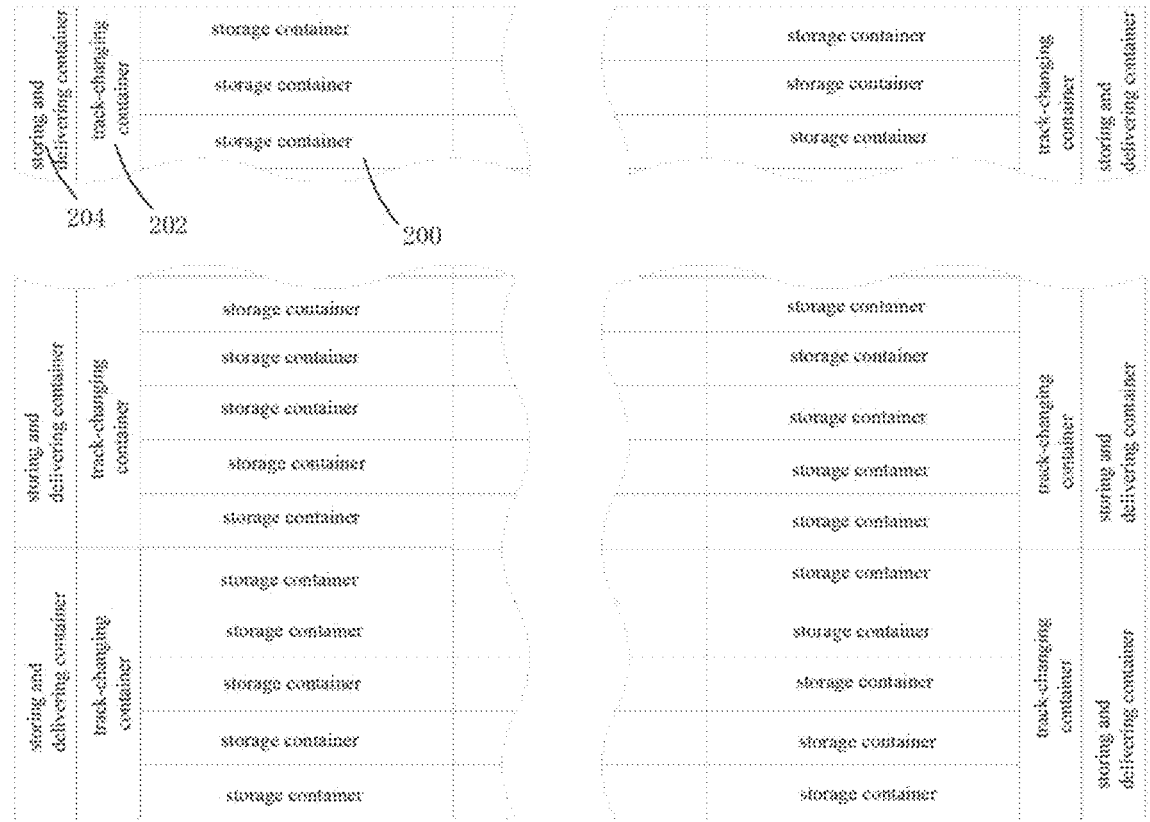
FIG. 17 is a top schematic view of a modular warehouse system.

As shown in FIG. 17, in a horizontal plane, a plurality of storage containers 200 are combined in length and width directions of the storage container 200, one or more track-switching containers 202 are arranged at opposite ends in the length direction of the plurality of storage containers 200, and one or more outbound-inbound containers 204 are arranged on an outer side of the one or more track-switching containers 202. In the illustrated embodiment, the storage container 200, the track-switching container 202, and the outbound-inbound container 204 are standardized containers, the number of which may be increased or decreased based on the requirements and according to specific combining manners. For example, based on the number of the storage containers 200 combined in the width direction, the number of track-switching containers 202 to be combined changes accordingly, and similarly, the number of outbound-inbound containers 204 to be combined also changes accordingly.

Figure 18:
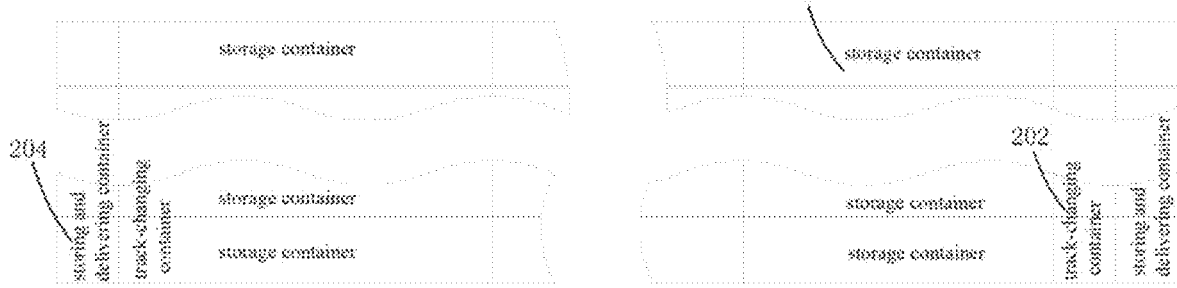
FIG. 18 is a side schematic view of the modular warehouse system.

As shown in FIG. 18, the modular warehouse system may have one or more layers in a height direction of the container, with each layer having a layout as shown in FIG. 17.

Figure 19:
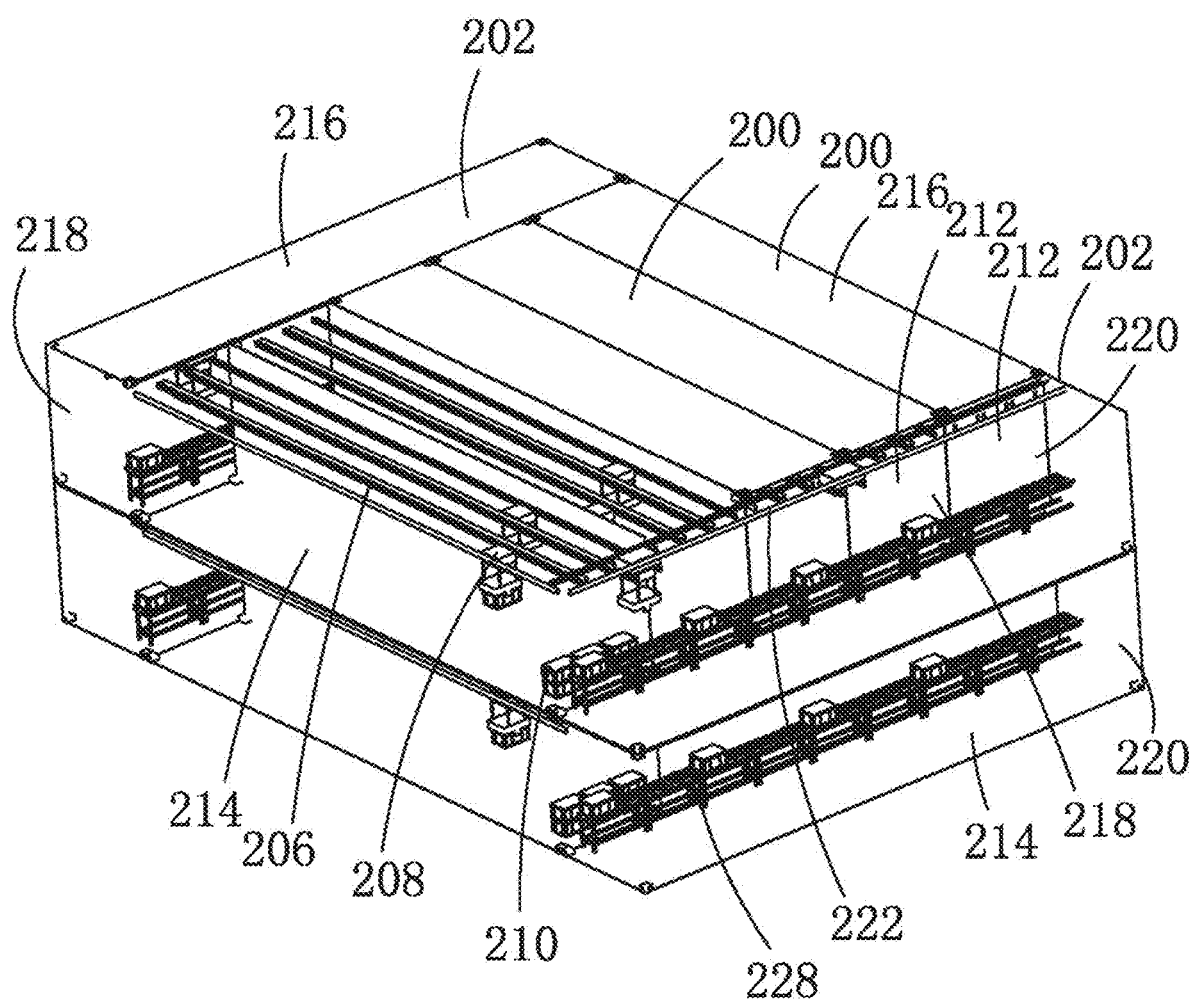
FIG. 19 is a perspective schematic view of an embodiment of the modular warehouse system.
Figure 20:
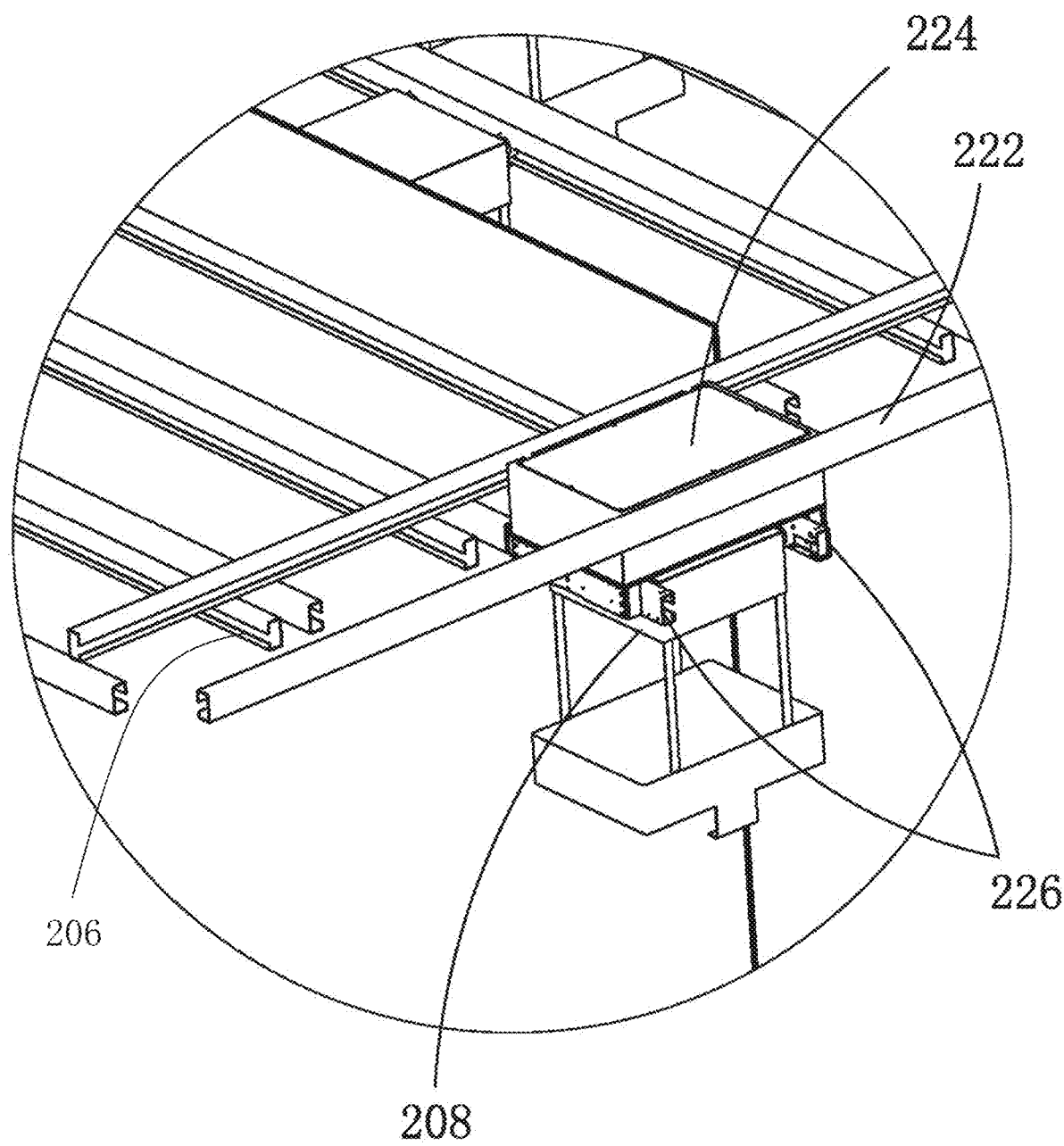
FIG. 20 is a partial enlarged view of the modular warehouse system, which shows a track-switching robot, a docking track and a transition track.

FIGS. 19 and 20 are simplified embodiments showing combined structure and principle of the present application in detail. FIG. 19 shows an example of a two-layer structure, with five storage containers 200 provided in the same layer and combined in the width direction of the storage container 200. One track-switching container is provided at each end of the storage container, such that the track-switching container is arranged perpendicular to the storage container 200. In this embodiment, the track-switching container and the outbound-inbound container are merged with each other, that is to say, the components in the track-switching container and the components in the outbound-inbound container are integrated into a single container. Therefore, this container may be called as a track-switching container with outbound-bound function (with outbound and inbound devices), or it may be called as an outbound-inbound container with track switching function (with track-switching components). For ease of description, in this embodiment, this container is referred to as "track-switching container 202".

The plurality of the storage containers 200 are combined together to form a combined storage area. The combined storage area is provided with a track assembly 206, a bin gripping robot 208 located on the track assembly 206, and a plurality of bins 210 located below the bin gripping robot 208 for storing goods. The bin gripping robot 208 may move back and forth on the track assembly 206 to access the bins 210. The structures and principles of the above-mentioned track assembly 206, bin gripping robot 208, and bins 210 may be the same as the related features in the embodiment illustrated in FIGS. 1-16, so the details thereof will not be repeated.

The aforementioned combined storage area should be understood as the sum of the storage areas formed by each container. In the illustrated embodiment, the combined storage area includes five sub-storage areas 212, each of which is formed by one storage container 200. Each sub-storage area 212 is provided with the above-mentioned track assembly 206, bin gripping robot 208, and bins 210.

The storage container 200 includes a container body, which includes a bottom plate 214, a top plate 216, two side plates 218 connected to long sides of the top plate 216 and the bottom plate 214, and two end plates 220 connected to short sides of the top plate 216 and the bottom plate 214. All of the track assembly 206, the bin gripping robot 208 and the bins 210 are arranged in the container body of the storage container 200. Before the storage container 200 is transported, at least the track assembly 206 has been installed in the container body, for example, installed to the top plate 216 or the side plate 218 of the container body through a connector. The track of the track assembly 206 extends in the length direction of the storage container 200.

Like the storage container 200, the track-switching container 202 also has a bottom plate 214, a top plate 216, two side plates 218 connected to long sides of the top plate 216 and the bottom plate 214, and two end plates 220 connected to short sides of the top plate 216 and the bottom plate 214. After the track-switching container 202 is assembled to one end of the storage container 200 in the longitudinal direction, the internal space of the track-switching container 202 is communicated with the internal space (i.e., the sub-storage areas 212) of the storage containers 200. The track-switching container 202 is provided with a track-switching device therein, which is configured to switch the bin gripping robot 208 in at least one of the storage containers 200 from a current running track where the bin gripping robot is located to a target running track. In the illustrated embodiment, as shown in FIG. 20, the track-switching device includes a transition track 222 and a track-switching robot 224. Before the track-switching container 202 is transported, at least the transition track 222 has been installed in the track-switching container 202, for example, to the top plate 216 or the side plate 218 of the container body of the track-switching container 202 through a connector. The track-switching robot 224 is located on the transition track 222 and can move back and forth on the transition track 222. The track-switching robot 224 is configured to receive the bin gripping robot and transport the bin gripping robot to the target running track along the transition track 222. The track-switching robot 224 is provided with a docking track 226 matching the end of the track assembly 206.

The transition track 222 extends in the length direction of the track-switching container 202 and is perpendicular to the running track 206 in each column of storage containers. The track-switching robot 224 includes a vehicle body and a moving mechanism installed on the vehicle body and fitted to the transition track. The moving mechanism is connected to a driving device and driven by the driving device to drive the track-switching robot to move back and forth along the transition track. The docking track 226 is provided on the vehicle body of the track-switching robot 224, such that when the track-switching robot 224 moves along the transition track 222 to be directly opposite to the running track 206 arranged in the storage container, the docking track 226 is just at the same height as that of the running track 206, and thus the docking track 226 on the vehicle body of the track-switching robot 224 is aligned with and connected to the end of the running track arranged in this storage container. At this time, the bin gripping robot 208 may smoothly slide along the running track 206 directly to the docking track 226 of the track-switching robot 224. Then, the track-switching robot 224 is driven to run along the transition track, such that the track-switching robot 224 is switched to be directly opposite to a different running track of the storage container, and the docking track 226 on the vehicle body of the track-switching robot 224 is aligned with and connected to the end of the different running track of the storage container. At this time, the bin gripping robot 208 may slide from the docking track 226 of the track-switching robot to the different running track of the storage container. In this way, switching between different track assemblies 206 of the storage containers for the bin gripping robot 208 can be achieved through the track-switching container 202. The structure and principle of the track-switching mechanism are described in detail in the Chinese invention patent application titled with "Three Dimensional Warehouse System" and filed by the same applicant on Jul. 24, 2018, the entire content of which is incorporated herein by reference.

As mentioned above, in the embodiment shown in FIG. 19, the function of the outbound-inbound container is integrated into the track-switching container 202. The track-switching container 202 is provided with an outbound-inbound device for performing goods outbound and inbound operations. In the illustrated embodiment, the outbound and inbound device includes a support table 228, which is arranged on the bottom plate 214 of the outbound-inbound container/track-switching container 202 and located below the transition track 222 for temporary storage of the bins. The outbound-inbound device is installed in the track-switching container 202 before the track-switching container 202 is installed at one end of the plurality of storage containers 200. The bin 210 in the storage container 200 is taken out by the bin gripping robot 202, and the track-switching robot 224 carries and moves the bin gripping robot 202 so as to place the bin 210 at a designated position on the support table. At this time, operators or robots may be deployed in the outbound-inbound container/track-switching container 202 to perform goods picking operations. The outbound-inbound container/track-switching container 202 may also be equipped with a goods conveying device, which is responsible for conveying the bins into and/or out of the warehouse. As an embodiment of the outbound-inbound device, FIG. 19 illustrates a fixing type of outbound-inbound device, that is, the bin is kept stationary on the support table.

Figure 21:
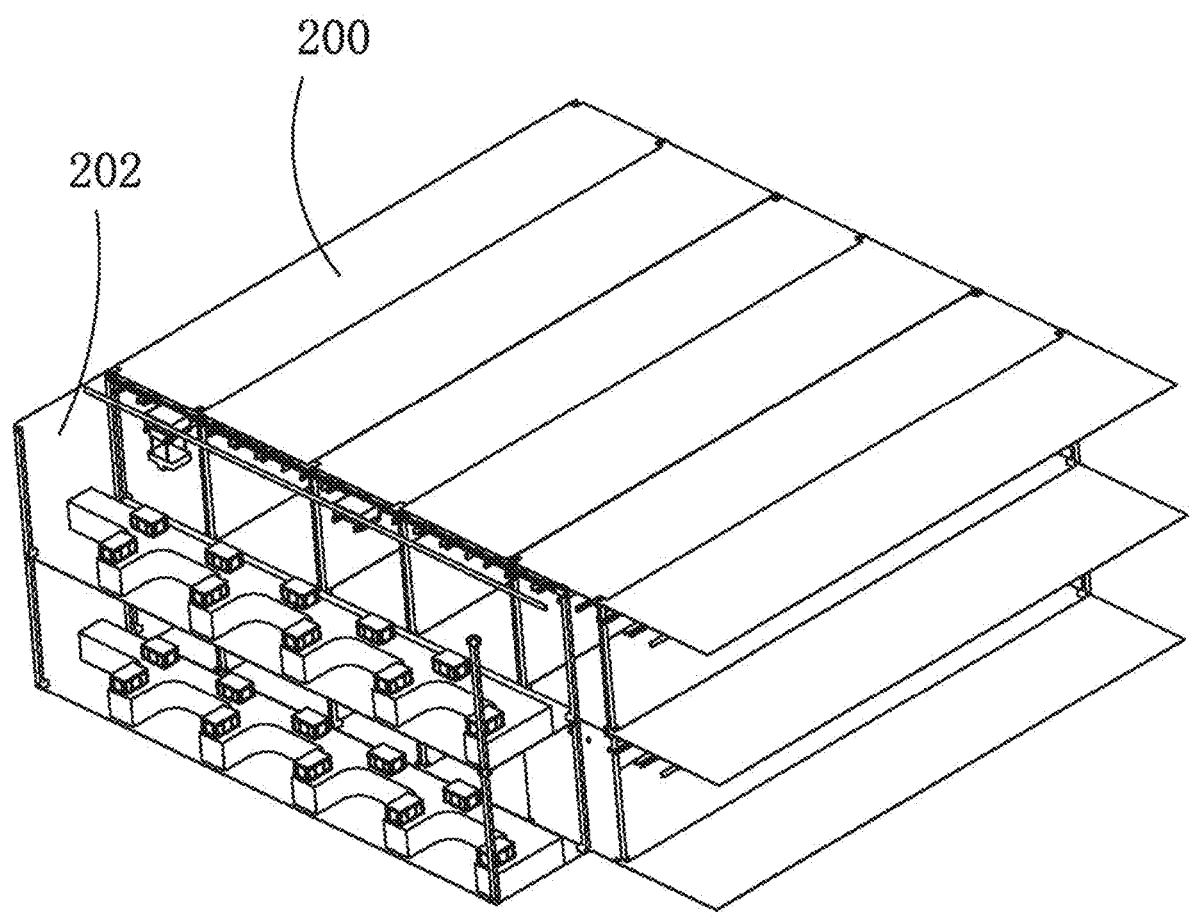
FIG. 21 is a perspective schematic view of another embodiment of a modular warehouse system.

FIG. 21 illustrates another outbound-inbound device, which is a pipeline type of outbound-inbound device. Although two types of outbound-inbound device have been exemplified herein, it should be understood that the outbound-inbound device may have more implementations, as long as the goods outbound and inbound function can be realized. In addition, although they are all called as "outbound-inbound device", they may realize only the outbound function, only the inbound function, or both the outbound and inbound functions, depending on different situations.

Figure 22:
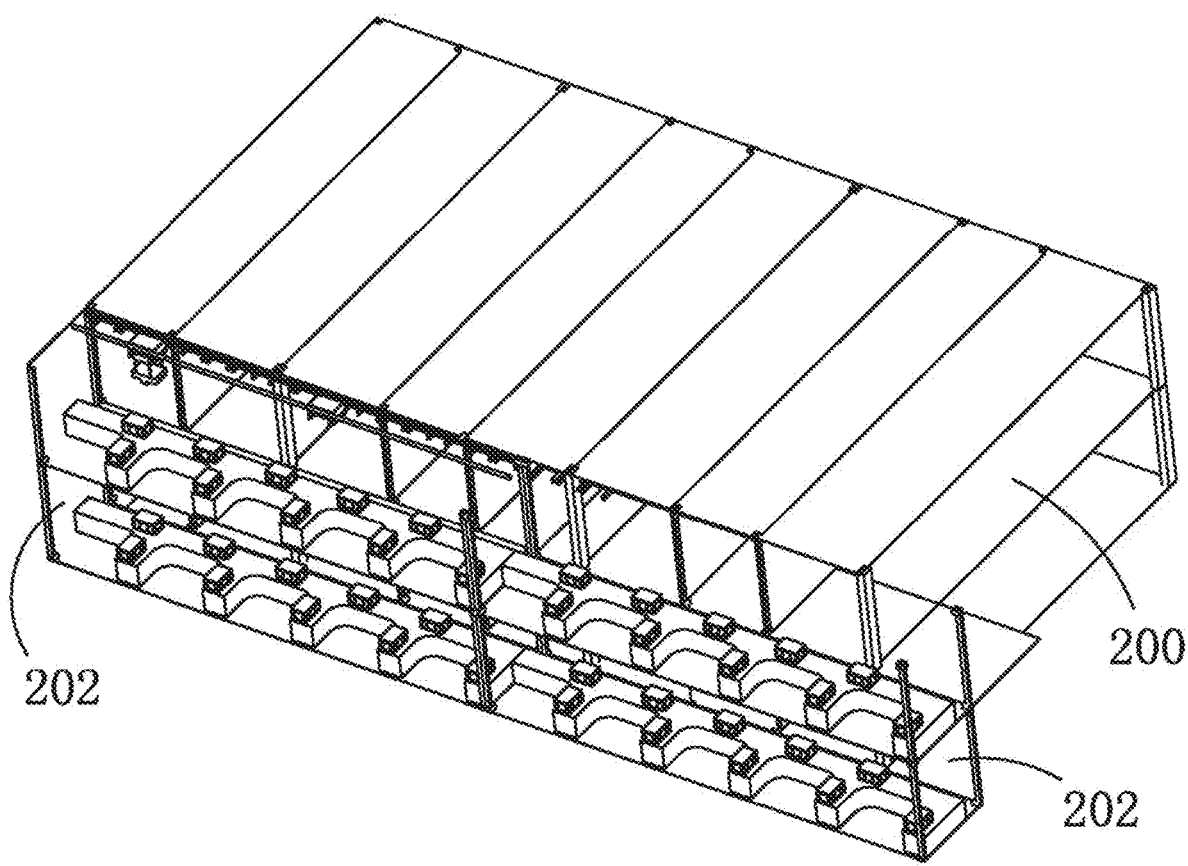
FIG. 22 is a perspective schematic view of further embodiment of a modular warehouse system.

FIG. 22 is similar to FIG. 21, except that two outbound-inbound containers are shown in each layer.

In the embodiments of FIGS. 19-22, the track-switching container 202 also includes an outbound-inbound device therein, that is, a container having both the track-switching function and outbound-inbound function is combined with the storage container 200. In another embodiment, it is also possible to combine a container having the outbound-inbound function but having no track-switching function with the storage container 200, that is, the outbound-inbound container having no track-switching function is combined with the storage container 200.

Therefore, an embodiment of the present invention provides a modular warehouse system, including:

a plurality of storage containers combined to form a combined storage area, wherein the combined storage area is provided with a track assembly, a bin gripping robot located on the track assembly, and a number of bins located below the bin gripping robot for storing goods, the bin gripping robot is able to move back and forth on the track assembly to access the bins, and the track assembly is fixed on a plate of the storage container; and at least one outbound-inbound container equipped with an outbound-inbound device for performing goods outbound and inbound operations, wherein the internal space of the outbound-inbound container is communicated with the combined storage area, such that the bin gripping robot is able to transport goods between the combined storage area and the outbound-inbound device.

The outbound-inbound device is the same as that of the foregoing embodiment, and will not be repeated here. In absence of a track-switching device, the bin gripping robot directly transports goods to the outbound-inbound device, for example, to the support table, without the assistance of the track-switching robot.

When there are multiple storage containers combined in a width direction of the storage container, the outbound-inbound container is perpendicular to the plurality of storage containers combined in the width direction, and the internal space of the outbound-inbound container is communicated with the internal space formed by the plurality of storage containers arranged in the width direction.

When at least two outbound-inbound containers are provided, the at least two outbound-inbound containers are combined in a length direction of the outbound-inbound containers, and when the at least two outbound-inbound containers are combined, adjacent end plates are removed to realize the internal space communication.

Figure 23:
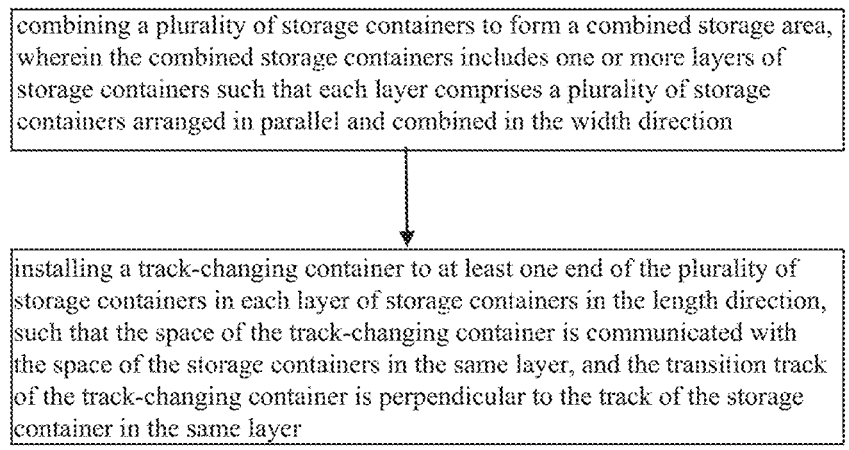
FIG. 23 is a flowchart of an embodiment of an assembly method of a modular warehouse system.

FIG. 23 shows an assembly method of a modular warehouse system. The method includes:

combining a plurality of storage containers to form a combined storage area, with each storage container defining a length direction and a width direction, wherein the combined storage containers include one or more layers of storage containers, such that each layer includes a plurality of storage containers arranged in parallel and combined in the width direction, the combined storage area is provided with tracks for allowing the bin gripping robot to move thereon, and the tracks have been installed in the plurality of storage containers before the plurality of storage containers are combined;

installing a track-switching container to at least one end of the plurality of storage containers in each layer of storage containers in the length direction, such that the space in the track-switching container is communicated with the space in the storage containers arranged in the same layer, and a transition track of the track-switching container is perpendicular to the tracks of the storage containers arranged in the same layer, wherein the transition track is configured for allowing the track-switching robot to move thereon back and forth, and the transition track of the track-switching container has been fixed to the track-switching container before the track-switching container is installed to the end of the plurality of storage containers.

As mentioned above, each storage container and each track-switching container include a container body, which includes a bottom plate, a top plate, two side plates connecting long sides of the bottom plate and top plate, and two end plates connecting short sides of the bottom plate and top plate. When assembling the track-switching container 202 with the storage container 200, one of the side plates of the track-switching container 202 facing the storage container 200 is removed, and one of the end plates of each storage container 200 that faces the track-switching container 202 is removed to realize the internal space communication, so that the bin gripping robot 208 may move from the storage container 200 to the track-switching container 202.

When at least two track-switching containers 202 are combined in the length direction of the track-switching container 202 (see FIG. 17 and FIG. 18), the adjacent end plates are removed to realize the communication of the internal spaces of the adjacent track-switching containers.

When the outbound-inbound container 204 and the track-switching container 202 are separately arranged, the assembly method further includes: arranging the outbound-inbound container 204 in parallel to and outside the track-switching container 202, with the number of the outbound-inbound containers 204 consistent with the number of the track-switching containers. Similarly, the container body of the outbound-inbound container also has a bottom plate, a top plate, two side plates connecting the long sides of the bottom plate and the top plate, and two end plates connecting the short sides of the bottom plate and the top plate. When the outbound-inbound containers 204 are combined in their length direction, the adjacent end plates are removed to realize the internal space communication of the adjacent outbound-inbound containers 204. When the track-switching container is assembled with the outbound-inbound container, the adjacent side plates of the track-switching container 202 and the outbound-inbound container 204 are removed to realize the internal space communication therebetween.

When the storage containers 200 are combined in their length direction, their adjacent end plates are removed to realize the internal space communication of the adjacent storage containers 200.

When there are multiple layers of containers, the containers are arranged orderly such that corner pieces of the containers are aligned, the corner pieces of the containers are fixedly connected in the height direction by connectors, and a gap between the containers is sealed by a sealer.

In the foregoing embodiments, in assembly, the containers are densely combined together such that only some plates of the containers are removed and the respective volume of each storage container 200 remains unchanged, that is, each sub-storage area is formed by one of the storage containers 200, and the total volume of the combined storage area is basically equal to the sum of the volumes of all storage containers 200. However, in some other embodiments, the total volume of the combined storage area may also be greater than the sum of the volumes of all storage containers.

Figure 24:
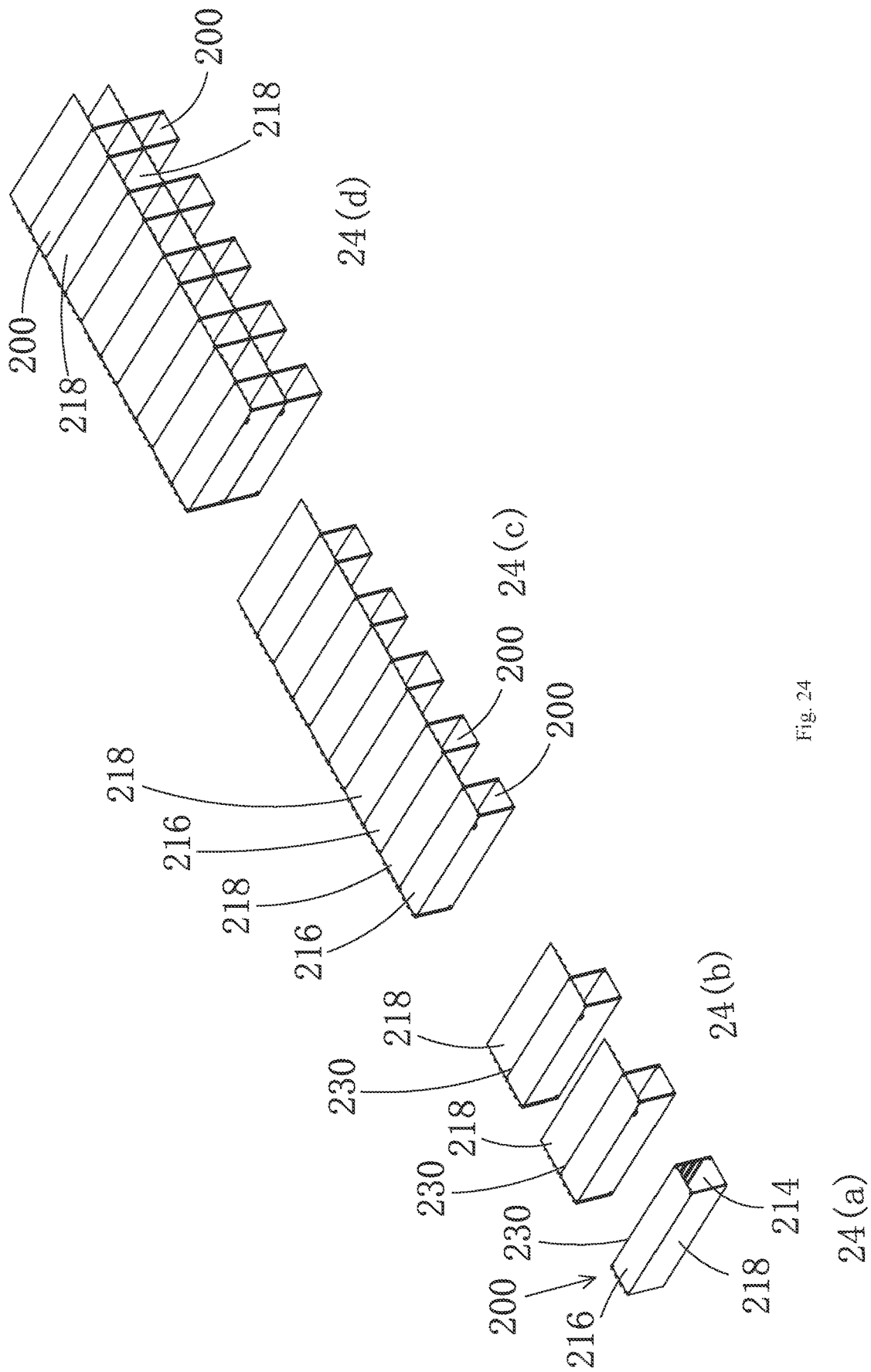
FIG. 24 is a schematic view showing an embodiment of an assembly method of the modular warehouse system, in which a side plate of a container body can be unfolded relative to a top plate.
Figure 25:
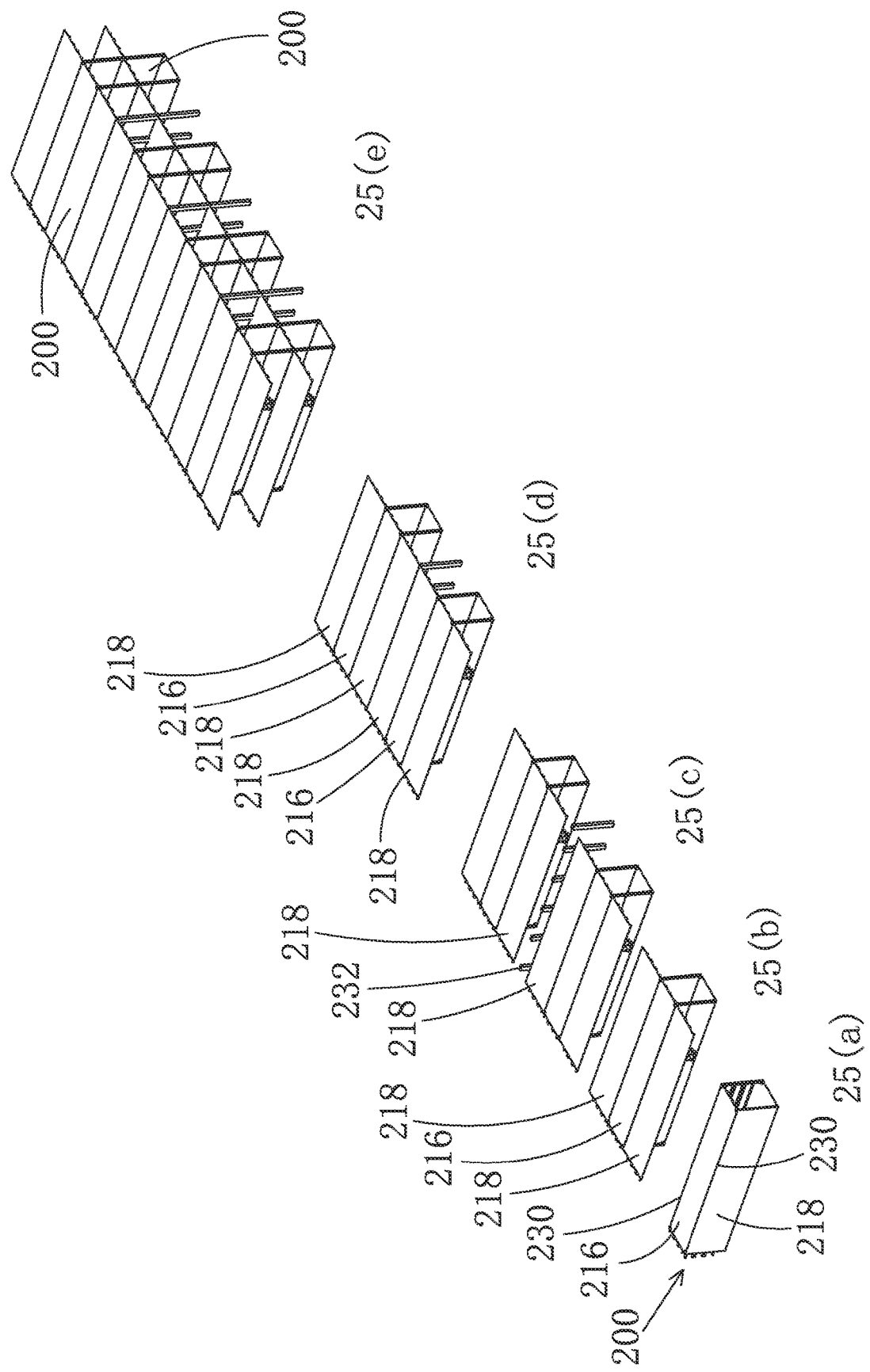
FIG. 25 is a schematic view of another embodiment of an assembly method of the modular warehouse system, in which side plates on two opposite sides of a container body can be unfolded relative to a top plate.

FIGS. 24 and 25 show another method of assembling or combining containers. In this method, combining the plurality of storage containers includes:

arranging a plurality of storage containers in parallel in the width direction of the storage container such that adjacent storage containers are separated by a distance; and bridging two adjacent storage containers by use of a horizontally arranged plate.

Unlike the dense combination of storage containers in the embodiment of the aforementioned assembly method, in this embodiment, adjacent storage containers are separated by a distance, and then a horizontally arranged plate is used to bridge the distance. Thereby, an additional sub-storage area is formed below the horizontally arranged plate to store more goods. The horizontally arranged plate may be embodied in various implementations. FIGS. 24 and 25 show its two implementations, which are introduced as follows.

As shown in FIG. 24, in step 24(a), the storage container 200 is provided first. A container body of the storage container 200 has a bottom plate 214, a top plate 216, and two side plates 218 connected to the long sides of the top plate 216 and the bottom plate 214. One side of one of the side plates 218 is rotatably connected with the top of the storage container 200.

In step 24(b), the other side of this side plate 218 of each storage container 200 is rotated outwards and upwards by 90 degrees such that the side plate 218 is in a horizontal state.

In step 24(c), the other side of this side plate 218, which is free, is supported and connected by one adjacent storage container so as to be kept in the horizontal state. Several storage containers are connected sequentially in this way and combined in the width direction of the storage containers. Thereby, an additional sub-storage area is formed under each side plate 218 turned to the horizontal state so as to store additional bins.

In step 24(d), another layer of containers is combined in the same way to realize a multi-layer warehouse system.

In the embodiment of FIG. 24, said plate is the side plate of the storage container that may be turned. In general, each storage container 200 forms two sub-storage areas by turning and unfolding the side plate at one side, that is, with the same number of storage containers, the space for storing the bins can be doubled. It should be pointed out that the above steps are not intended to be executed in a particular order. For example, in steps 24(b) and 24(c), the side plate 218 that has been turned to the horizontal state may be first supported and connected to the adjacent storage container, and then the side plate 218 of the adjacent storage container is turned. Before the storage container is transported, the inner side of the side plate 218 has been installed with a track for allowing the bin gripping robot 208 to move therealong. After being turned, the track is located on a lower surface of the side plate 218 arranged horizontally. Therefore, in this embodiment, tracks are pre-installed on the top plate of the storage container and one of the side plates that needs to be turned.

As shown in FIG. 25, in step 25(a), a storage container 200 is provided first. A container body of the storage container 200 has a bottom plate 214, a top plate 216, and two side plates 218 connected to the long sides of the top plate 216 and the bottom plate 214. One side 230 of each side plate 218 is rotatably connected with the top of the storage container 200.

In 25(b), the other sides of the two side plates 218 of the storage container 200 are rotated outwards and upwards by 90 degrees such that the side plates 218 are each in a horizontal state.

In 25(c), the two side plates 218 of an adjacent storage container 200 are also turned to a horizontal state in the same manner. A supporting member 232 is provided between two adjacent storage containers 200. In this embodiment, several support posts 232 are provided.

In 25(d), the other sides of the two side plates 218 are abutted and supported by the supporting member 232, such that the two side plates 218 are kept in the horizontal state. In this way, one additional sub-storage area is formed under each side plate 218 turned to the horizontal state, which means that two additional sub-storage areas are formed between two adjacent storage containers 200 so as to store additional bins. More containers may be combined in this way. In the illustrated embodiment, the support posts 232 are located in the middle of two adjacent storage containers 200.

In 25(e), another layer of containers is combined in the same way to realize a multi-layer warehouse system.

In the embodiment of FIG. 25, said plates are the two side plates of the storage container that may be turned. In general, each storage container 200 forms three sub-storage areas by turning and unfolding the side plates at both sides, that is, with the same number of storage containers, the space for storing the bins can be trebled. It should be pointed out that the above steps are not intended to be executed in a particular order. For example, in steps 25(c) and 25(d), the side plates 218 of the storage container that have been turned to the horizontal state may be first supported by the supporting member 232, and then the side plates 218 of the adjacent storage container are turned. Similarly, before the storage container is transported, the inner side of the side plates 218 has been installed with tracks for allowing the bin gripping robot 208 to move therealong. After being turned, the tracks are located on lower surfaces of the side plates 218 arranged horizontally. Therefore, in this embodiment, tracks are pre-installed on the top plate and both side plates of the storage container.

In the above embodiments, by providing standardized and modular storage containers and track-switching containers, the standardized storage containers and track-switching containers may be stacked and combined according to a set manner, and the container bodies of the standardized storage containers and track-switching containers are respectively formed with detachable side plates, such that, during stacking and combining the storage container and track-switching container, the containers may be connected to form an integrated modular warehouse system with internal spaces of the containers in communication with each other after detaching their adjacent side plates. The warehouse and assembly method disclosed herein present a modular concept such that storage capacity can be expanded and adjusted based on the number and arrangement of containers. The storage containers, track-switching containers, and outbound-inbound containers are all standardized containers, which are easy to manufacture, have a low cost, are convenient to install. This can save time for infrastructure construction, and can realize rapid and mobile deployment of automated warehouses.

The concepts described herein can be implemented in other forms without departing from their spirit and characteristics. The specific embodiments disclosed should be regarded as being illustrative rather than restrictive. Therefore, the scope of the present invention is determined by the appended claims instead of the foregoing description. Any changes within the literal meaning and equivalent scope of the claims shall fall within the scope of these claims.

The invention claimed is:

1. A modular warehouse system, comprising:
 a plurality of storage containers combined to form a combined storage area, which is provided with a track assembly, a bin gripping robot located on the track assembly, and a plurality of bins located below the bin gripping robot for storing goods, wherein the bin gripping robot is capable of running back and forth on the track assembly to access the bins;
 at least one track-switching container, an internal space of which is in communication with the internal space of at least one of the plurality of storage containers, wherein the track-switching container is provided with a track-switching device therein, and the track-track-switching device is configured to switch the bin gripping robot in at least one of the storage containers from a current running track where the bin gripping robot is located to a target running track; and at least one outbound-inbound container, an internal space of which is in communication with the internal space of the track-switching container, wherein the outbound-inbound container is provided with an outbound-inbound device for performing goods outbound-inbound operations;

wherein the storage container defines a length direction, a width direction and a height direction, the track assembly located in the storage container extends in the length direction, the plurality of storage containers comprises a plurality of storage containers combined in the width direction, the track-switching container is perpendicular to the plurality of storage containers combined in the width direction, and the internal space of the track-switching container and the internal space formed by the plurality of storage containers arranged in the width direction communicate with each other.

2. The modular warehouse system according to claim 1, wherein each of the storage containers and the at least one track-switching container comprises a container body, which comprises a bottom plate, a top plate, two side plates connecting long sides of the bottom plate and the top plate, and two end plates connecting short sides of the bottom plate and the top plate; one of the side plates of the track-switching container facing the storage container is removed, and one of end plates of the storage container, which communicates with the track-switching container, facing the track-switching container is removed;

wherein the at least one track-switching container comprises at least two track-switching containers, and the at least two track-switching containers are combined in the length direction of the track-switching container and internally communicate with each other; the adjacent end plates of the at least two track-switching containers are removed when the at least two track-switching containers are combined;

wherein the at least one outbound-inbound container is arranged in parallel with the at least one track-switching container, and the number of the outbound-inbound containers is the same as that of the track-switching containers, and the outbound-inbound containers are combined in the length direction of the outbound-inbound containers and internally communicate with each other; the adjacent end plates of the outbound-inbound containers are removed when the outbound-inbound containers are combined;

wherein the adjacent side plates of the track-switching container and the outbound-inbound container are removed; and wherein the plurality of storage containers comprises a plurality of storage containers combined in the length direction, and the plurality of storage containers arranged in the length direction are combined with each other and internally communicate with each other; wherein the adjacent end plates of the storage containers are removed when the storage containers are assembled in the length direction.

3. The modular warehouse system according to claim 1, wherein the track-switching container and the outbound-inbound container are provided at each end of the combined storage area in the length direction.

4. The modular warehouse system according to claim 1, wherein the track-switching container and the outbound-inbound container are the same container.

5. The modular warehouse system according to claim 1, wherein the combined storage area comprises a plurality of sub-storage areas, with each sub-storage area provided with one of the track assemblies, at least one of the bin gripping robots, and some of the bins of the modular warehouse system, and each sub-storage area is formed by one of the storage containers.

6. The modular warehouse system according to claim 1, wherein the combined storage area comprises a plurality of sub-storage areas, with each sub-storage area provided with one of the track assemblies, at least one of the bin gripping robots, and some of the bins of the modular warehouse system, and each storage container forms two sub-storage areas;

wherein each storage container comprises a container body which comprises a bottom plate, a top plate, and two side plates connecting long sides of the bottom plate and the top plate; and in the width direction, the top plates of two adjacent storage containers are separated by a distance, and a horizontally arranged plate is bridged between the top plates of the two adjacent storage containers, so that one sub-storage area is formed below the horizontally arranged plate; and wherein the horizontally arranged plate is one of the side plates of the two adjacent storage containers, and one side of the side plate is rotatably connected to the top of one of the storage containers, and the other side thereof rotates outwards and upwards by 90 degrees and is supported by another storage container of the two adjacent storage containers.

7. The modular warehouse system according to claim 1, wherein the combined storage area comprises a plurality of sub-storage areas, with each sub-storage area provided with one of the track assemblies, at least one of the bin gripping robots, and some of the bins of the modular warehouse system, and each storage container forms three sub-storage areas;

wherein each storage container comprises a container body which comprises a bottom plate, a top plate, two side plates connecting long sides of the bottom plate and the top plate; and in the width direction, the top plates of two adjacent storage containers are separated by a distance, and a horizontally arranged plate is bridged between the top plates of the two adjacent storage containers, such that two sub-storage areas are formed below the horizontally arranged plate; and wherein the horizontally arranged plate comprises two adjacent side plates of the two adjacent storage containers, and one side of each side plate is rotatably connected with the top of the respective storage container, and the other side thereof is rotated outwards and upwards by 90 degrees such that the two side plates have a horizontal state, thereby forming one of the two sub-storage areas under each side plate.

8. The modular warehouse system of claim 1, wherein the track-switching device comprises:

a transition track fixed on a top plate or a side plate of the track-switching container, wherein the transition track is perpendicular to an end of the track assembly in at least one of the storage containers; and a track-switching robot located on the transition track and capable of moving back and forth on the transition track, wherein the track-switching robot is configured to receive the bin gripping robot and transport the bin gripping robot along the transition track to the target running track, and the track-switching robot is provided with a docking track matching the end of the track assembly;

wherein the outbound-inbound device comprises a support table; which is arranged on a bottom plate of the outbound-inbound container and is located below the transition track for temporary storage of the bin; and wherein the outbound-inbound device comprises a picking device for picking goods in the bins stored on the support, table and a goods conveying device for transporting the goods so as to achieve inbound-outbound operations.

9. An assembly method of a modular warehouse system, characterized by comprising:

combining a plurality of storage containers to form a combined storage area, with each storage container defining a length direction and a width direction, wherein the combined storage containers comprise one or more layers of storage containers, such that each layer comprises a plurality of storage containers arranged in parallel and combined in the width direction, and wherein the combined storage area is provided with a track for running of a bin gripping robot, wherein the track has been installed in the plurality of storage containers before the plurality of storage containers are combined;

installing a track-switching container to at least one end of the plurality of storage containers in each layer of storage containers in the length direction, such that the space of the track-switching container is communicated with the space of the storage containers in the same layer, and a transition track of the track-switching container is perpendicular to the track of the storage container in the same layer, wherein the transition track is configured for running of a track-switching robot thereon back and forth, and wherein the transition track of the track-switching container has been fixed to the track-switching container before the track-switching container is installed to the end of the plurality of storage containers.

10. The assembly method of the modular warehouse system according to claim 9, wherein each of the storage containers and track-switching container comprises a container body, which comprises a bottom plate, a top plate, two side plates connecting long sides of the bottom plate and top plate, and two end plates connecting short sides of the bottom plate and top plate; the method further comprising: removing one of the side plates of the track-switching container facing the storage container, and removing one of the end plates of each storage container, the internal space of which is in communication with that of the track-switching container, facing the track-switching container; and wherein installing the track-switching container comprises combining at least two track-switching containers in the length of the track-switching container, and when the at least two track-switching containers are combined, their adjacent end plates are removed to make their interiors communicate with each other.

11. The assembly method of the modular warehouse system according to claim 9, wherein each of the storage containers and track-switching container comprises a container body, which comprises a bottom plate, a top plate, two side plates connecting long sides of the bottom plate and top plate, and two end plates connecting short sides of the bottom plate and top plate; the method further comprising: removing one of the side plates of the track-switching container facing the storage container, and removing one of the end plates of each storage container, the internal space of which is in communication with that of the track-switching container, facing the track-switching container; the assembly method further comprising assembling an outbound-inbound container to the track-switching container, wherein the outbound-inbound container comprises a container body, which comprises a bottom plate, a top plate, two side plates connecting the long sides of the bottom plate and the top plate, and two end plates connecting the short sides of the bottom plate and the top plate; the assembly method comprises removing the adjacent side plates of the assembled track-switching container and outbound-inbound container to make their internal spaces communicate with each other.

12. The assembly method of the modular warehouse system according to claim 9, wherein each of the storage containers and track-switching container comprises a container body, which comprises a bottom plate, a top plate, two side plates connecting long sides of the bottom plate and top plate, and two end plates connecting short sides of the bottom plate and top plate; the method further comprising: removing one of the side plates of the track-switching container facing the storage container, and removing one of the end plates of each storage container, the internal space of which is in communication with that of the track-switching container, facing the track-switching container; and wherein combining the plurality of storage containers comprises combining at least two storage containers in the length direction, and when the at least two storage containers are combined in the length direction, their adjacent end plates are removed so that the internal spaces of the at least two storage containers are communicated with each other.

13. The assembly method of the modular warehouse system according to claim 9, wherein combining the plurality of storage containers comprises:

arranging the plurality of storage containers in parallel and in the width direction such that adjacent storage containers are separated by a distance; and bridging a horizontally arranged plate between two adjacent storage containers.

14. The assembly method of the modular warehouse system according to claim 13, wherein the horizontally arranged plate is one of side plates of the two adjacent storage containers, one side of the side plate is rotatably connected to the top of one of the storage containers, and the assembly method comprises rotating the other side of the side plate outwards and upwards by 90 degrees so as to be supported by another storage container of the two adjacent storage containers and kept in the horizontal state, thereby forming one sub-storage area of the combined storage area under the side plate.

15. The assembly method of the modular warehouse system according to claim 13, wherein the horizontally arranged plate comprises two adjacent side plates of the two adjacent storage containers, one side of each side plate is rotatably connected with the top of the respective storage container, and the assembly method comprises rotating the other side of each of the two side plates outwards and upwards by 90 degrees such that the two side plates are kept in a horizontal state, thereby forming one sub-storage area of the combined storage area under each side plate; and wherein keeping the two side plates in the horizontal state comprises using a supporting member to support the other side of each of the two side plates.

16. A modular warehouse system, comprising:
a plurality of storage containers combined to form a combined storage area, which is provided with a track assembly, a bin gripping robot located on the track assembly, and a plurality of bins located below the bin gripping robot for storing goods, wherein the bin gripping robot is capable of running back and forth on the track assembly to access the bins, and the track assembly is fixed on a plate of the storage container; and
at least one outbound-inbound container, which is equipped with an outbound-inbound device for performing goods outbound-inbound operations, wherein an internal space of the outbound-inbound container is communicated with an internal space of the combined storage area, such that the bin gripping robot can transport goods between the combined storage area and the outbound-inbound device;
wherein the storage container defines a length direction, a width direction and a height direction, and the track assembly located in the storage container extends in the length direction, the plurality of storage containers comprises a plurality of storage containers combined in the width direction, the outbound-inbound container is perpendicular to the plurality of storage containers combined in the width direction, and the internal space of the outbound-inbound container and the internal space formed by the plurality of storage containers arranged in the width direction communicate with each other;
wherein the at least one outbound-inbound container comprises at least two outbound-inbound containers combined in the length direction of the outbound-inbound container and internally communicated with each other; and
wherein each outbound-inbound container comprises a container body which comprises a bottom plate, a top plate, two side plates connecting long sides of the bottom plate and the top plate, and two end plates connecting short sides of the bottom plate and the top plate; and the adjacent end plates are removed when the at least two outbound-inbound containers are combined.

17. The modular warehouse system according to claim 16, wherein the plurality of storage containers comprise a plurality of storage containers combined in the length direction, and the plurality of storage containers arranged in the length direction are combined with each other in the length direction and communicate with each other inside; and
wherein each storage container comprises a container body, which comprises a bottom plate, a top plate, and two side plates connecting long sides of the bottom plate and the top plate of the container body of each storage container, and two end plates connecting short sides of the bottom plate and the top plate of the container body of each storage container; and the adjacent end plates of the container body of the storage containers are removed when the storage containers are assembled in the length direction.

18. The modular warehouse system according to claim 16, wherein the outbound-inbound container is provided with a track-switching device therein, and the track-switching device comprises:
a transition track fixed on the top plate or the side plate of the outbound-inbound container, and perpendicular to the end of the track assembly in the at least one storage container; and
a track-switching robot that is located on the transition track and movable back and forth on the transition track, wherein the track-switching robot is configured to receive the bin gripping robot and move the bin gripping robot along the transition track to a target running track, and wherein the track-switching robot is provided with a docking track matching the end of the track assembly thereon.

* * * * *